United States Patent [19]
Aoyama et al.

[11] Patent Number: 5,432,829
[45] Date of Patent: Jul. 11, 1995

[54] FUEL ASSEMBLY AND REACTOR CORE

[75] Inventors: Motoo Aoyama, Mito, Japan; Taro Ueki, Ann Arber, Mich.; Akinobu Nakajima, Hitachi, Japan; Yoko Ishibashi, Hitachiohta, Japan; Kunitoshi Kurihara, Katsuta, Japan; Osamu Yokomizo, Ibaraki, Japan; Yasuhiro Masuhara, Katsuta, Japan; Junichi Yamashita, Hitachi, Japan; Yasunori Bessho, Mito, Japan; Junjiro Nakajima, Hitachi, Japan

[73] Assignee: Hitachi, Ltd., Tokyo, Japan

[21] Appl. No.: 996,774

[22] Filed: Dec. 23, 1992

[30] Foreign Application Priority Data

Dec. 26, 1991 [JP]  Japan .................. 3-345601
Aug. 6, 1992 [JP]  Japan .................. 4-210539

[51] Int. Cl.$^6$ .................................................. G21C 3/32
[52] U.S. Cl. .................................. 376/434; 376/444; 376/448; 376/435
[58] Field of Search ............... 376/428, 435, 444, 448, 376/434; 976/DIG. 60, DIG. 64

[56] References Cited

U.S. PATENT DOCUMENTS

| | | | |
|---|---|---|---|
| 4,876,062 | 10/1989 | Aoyama et al. | 376/444 |
| 4,926,450 | 5/1990 | Masuhara et al. | 376/444 |
| 4,968,479 | 11/1990 | Ogiya et al. | 376/428 |
| 5,009,840 | 4/1991 | Ueda et al. | 376/435 |
| 5,068,082 | 11/1991 | Ueda et al. | 376/428 |
| 5,202,085 | 4/1993 | Aoyama et al. | 376/435 |
| 5,299,244 | 3/1994 | Yamauchi et al. | 376/438 |

*Primary Examiner*—Donald P. Walsh
*Assistant Examiner*—Meena Chelliah
*Attorney, Agent, or Firm*—Antonelli, Terry, Stout & Kraus

[57] ABSTRACT

A fuel assembly comprises fuel rods arrayed in a square lattice pattern of 10 rows and 10 columns, and three large-diameter water rods arranged along a diagonal line of the fuel assembly in such a region as able to accommodate 10 fuel rods. Partial length fuel rods are arranged in an outermost layer of the fuel rod array at fuel rod setting positions other than corners of the outermost layer. Ordinary fuel rods are arranged in a layer inside the outermost layer and adjacent to the outermost layer at positions adjacent to the partial length fuel rods in the outermost layer.

The struction of the fuel assembly enables a reduction in the void coefficient and an improvement in the reactivity control capability. Also, the void coefficient can be reduced without lowering reactivity, and fuel economy is improved.

31 Claims, 22 Drawing Sheets

FUEL ASSEMBLY AND REACTOR CORE

BACKGROUND OF THE INVENTION

The present invention relates to a fuel assembly and a reactor core, and more particularly to a fuel assembly for use in a boiling water reactor and a core of such a reactor.

A conventional fuel assembly loaded in a boiling water reactor comprises a channel box in the form of a rectangular tube and a fuel bundle housed in the channel box. The fuel bundle comprises upper and lower tie plates respectively fitted to upper and lower portions of the channel box, a plurality of spacers installed in the channel box with intervals therebetween in the axial direction, a number of fuel rods penetrating through the spacers and arrayed in a square lattice pattern with their opposite ends fixed to the tie plates, and at least one water rod.

Recently, raising a degree of burn-up of a fuel assembly has been attempted from the standpoints of prolonging the operating time, effectively utilizing uranium resource, and reducing the amount of spent fuel generated. For achieving a higher degree of burn-up, it is required to increase enrichment of a fuel assembly. With enrichment increasing, however, larger mean energy of neutrons has raised the problem that reactivity change due to void variations may increase, or effective utilization of fissionable material (fuel economy) may be impeded. The increased reactivity change due to void variations not only enlarges an absolute value of the void coefficient and lowers core stability, but also reduces a shutdown margin because of an increase in the hot-cold swing. Such a tendency is dealt with by increasing a moderator proportion (i.e., a ratio of moderator to fuel) in the fuel assembly and reducing mean energy of neutrons (i.e., making the neutron spectrum softer).

In a boiling water reactor, control rods and neutron detecting counters are disposed outside the channel box. Therefore, a gap is defined between fuel assemblies for allowing those units to be inserted therein. Since the gap is filled with saturation water, those fuel rods which are positioned in a peripheral portion of the fuel assembly (i.e., in a region nearer to the gap) and those fuel rods which are positioned in a central portion of the fuel assembly are affected by the saturation water in the gap in different ways. Specifically, in the peripheral portion of the fuel assembly nearer to the gap, the ratio of moderator to fuel is so large as to increase a moderating effect, thus making nuclear fissions in the fuel rods at such a position more active. On the contrary, the fuel rods positioned in the central portion of the fuel assembly are less affected by a moderating effect due to the saturation water in the gap. Thus, the ratio of moderator to fuel, as a factor of determining nuclear characteristics of a fuel assembly, is different depending on the position of the fuel assembly.

There are two methods of raising the ratio of moderator to fuel; i.e., a method of reducing a fuel inventory and a method of increasing a moderator region or moderator density. Practically, these methods are carried out by (1) increasing a boiling water region (e.g., diminishing the number of fuel rods or thinning the diameter of fuel rods), and (2) increasing a non-boiling water region (water rod region or gap water region).

In the fuel assembly prepared by adopting one of the above methods, however, the fuel inventory is reduced in any case, meaning that fuel economy is improved from the aspect of enlarging the ratio of moderator to fuel, but fuel economy is impeded in terms of the fuel inventory. Eventually, an improvement in fuel economy is not achieved. Furthermore, the above-mentioned methods give rise to new problems. With the method (1), the reduced total length of fuel rods increases a linear heat generation rate and decreases a thermal margin. With the method (2), the reduced area of flow paths for a coolant makes a pressure drop larger.

In a conventional fuel assembly, fuel rods are arrayed into a lattice pattern of 8 rows and 8 columns (i.e., $8 \times 8$). If the number of unit lattices in the fuel rod array is increased to $9 \times 9$ or $10 \times 10$, it would be possible to reduce a linear heat generation rate, enlarge a heat conducting area, and increase a thermal margin. Also, as illustrated in FIGS. 3 and 4 of JP, A, 52-50498, it is known to construct a fuel assembly by using partial length fuel rods which have a shorter fuel effective length. With this type fuel assembly, since the flow path area of a two-phase flow (in an upper portion of the core) having a large friction loss is enlarged, the pressure drop can be suppressed without reducing the fuel inventory. Consequently, by adopting the aforesaid methods (1) and (2) in addition to those two approaches, a fuel assembly can be obtained which is suitable for raising a degree of burn-up.

In view of the above, there has been proposed a fuel assembly that fuel rods are arrayed in a lattice pattern of $9 \times 9$ or $10 \times 10$ with each fuel rod having a larger outer diameter but the number of fuel rods being increased, the cross-sectional area of a water rod is made larger than that of a unit lattice, and further a plurality of partial length fuel rods are arranged, as disclosed in JP, A, 62-276493, JP, A, 64-31089 and U.S. Pat. No. 5,068,082, for instance.

More specifically, JP, A, 62-276493 discloses a fuel assembly having the increased number of unit lattices in the fuel rod array, in which a number of water rods or large-diameter water rods are arranged, and a plurality of partial length fuel rods are arranged in a row along a diagonal including corners of the lattice array of fuel rods. The partial length fuel rods are denoted by 14 FIGS. 1 and 5.

In FIGS. 1, 7 and 8, etc. of JP, A, 64-31089, there is disclosed a fuel assembly having the increased number of unit lattices in the fuel rod array, in which large-diameter water rods are arranged and one or a plurality of partial length fuel rods P are arranged at one or more corners of the lattice array of fuel rods.

In FIGS. 41 to 56 of U.S. Pat. No. 5,068,082, there are disclosed a fuel assembly having the increased number of unit lattices in the fuel rod array, in which a plurality of partial length fuel rods P are arranged together adjacently to large-diameter water rods. U.S. Pat. No. 5,068,082 also describes a fuel assembly having the increased number of unit lattices in the fuel rod array, in which large-diameter water rods are arranged, and a plurality of partial length fuel rods P are arranged in a row along a line bisecting each side of the lattice array of fuel rods at its outermost layer (e.g., FIGS. 2B, 6 and 10, etc.) or along a diagonal including corners of the lattice array of fuel rods (FIG. 5 and 12, etc.). Furthermore, U.S. Pat. No. 5,068,082 discloses another layout example of the partial length fuel rods P in which the partial length fuel rods P are arranged at each corner and the middle of each side of the lattice array of fuel rods in its outermost layer.

SUMMARY OF THE INVENTION

A first object of the present invention is to provide a fuel assembly which enables a higher degree of burn-up and reduces a void coefficient without lowering reactivity, and a reactor core loading such a fuel assembly therein.

A second object of the present invention is to provide a fuel assembly which enables a higher degree of burn-up, reduces a void coefficient without lowering reactivity, and further makes a local power peaking flat.

A third object of the present invention is to provide a fuel assembly which enables a higher degree of burn-up, reduces a void coefficient without lowering reactivity, and further makes a moderator's cross-sectional area of a neutron moderating rod optimum.

A feature of the present invention to achieve a fuel assembly meeting the above first object resides in that the fuel rods include a plurality of first fuel rods and one or more second fuel rods having a shorter fuel effective length than said first fuel rods; (b) said second fuel rods are arranged in an outermost layer of a fuel rod array in the square lattice pattern at positions other than corners of the outermost layer; and (c) among the fuel rods inside said outermost layer of said fuel rod array in the square lattice pattern and arranged in a layer adjacent to said outermost layer, those fuel rods adjacent to said second fuel rods in said outermost layer are said first fuel rods.

A feature of the present invention to achieve a reactor core meeting the above first object resides in that (a) said core includes a plurality of first fuel assemblies and a plurality of second fuel assemblies; (b) said first fuel assemblies each comprise a number of fuel rods arrayed in a square lattice pattern and at least one neutron moderating rod having a cross-sectional area of a moderator larger than a cross-sectional area of a unit lattice of the fuel rod array, said fuel rods including a plurality of first fuel rods and one or more second fuel rods having a shorter fuel effective length than said first fuel rods, said second fuel rods being arranged in an outermost layer of said fuel rod array in the square lattice pattern at positions other than corners of the outermost layer, among the fuel rods inside said outermost layer of said fuel rod array in the square lattice pattern and arranged in a layer adjacent to said outermost layer, those fuel rods adjacent to said second fuel rods in said outermost layer being said first fuel rods; and (c) said first fuel assemblies and said second fuel assemblies are loaded in a core central portion and a core circumferential portion, said first fuel assemblies having a smaller loading ratio in the core central portion than in the core circumferential portion.

The second object of the present invention is achieved by that when said neutron moderating rod is projected in two directions orthogonal to each other in said fuel rod array in a square lattice pattern, said second fuel rods arranged in said outermost layer are lacated inside a projected range of said neutron moderating rod including the outermost opposite regions of the projected range.

The third object of the present invention is achieved by setting the cross-sectional area of the moderator in said neutron moderating rods to 7–14 cm².

The present invention has been made based on the following studies. A description will now be given of results of the studies.

Taking into account application to existing cores, it is required in development of fuel assemblies having a higher degree of burn-up that a pressure drop, a thermal margin (linear heat generation rate, critical power) and other parameters remain the same as those in existing fuel assemblies.

As stated before, thinning the outer diameter of fuel rods and increasing the number of lattice cells in the fuel rod array are advantageous in achieving a fuel assembly with a higher degree of burn-up. However, such approaches raise new problems. If the number of lattice cells in the fuel rod array is simply enlarged, the degree of freedom in fuel array becomes larger, but the length of the peripheral edges is increased and so is a pressure drop. Also, the reduced outer diameter of fuel rods increases a time constant of fuel rods and hence makes stability (channel stability, core stability) more marginal. In order to solve those problems, an absolute value of the void coefficient is required to be smaller than that of the existing fuel assembly. Stated otherwise, while reducing an absolute value of the void coefficient has been discussed so far from the standpoint of increasing an enrichment of fuel, an absolute value of the void coefficient must be made still smaller in the case of enlarging the number of unit lattices in the fuel rod array.

As stated in connection with the above methods (1) and (2), a reduction in the reactivity coefficient such as the void coefficient requires increasing the ratio of moderator to fuel, i.e., increasing the water rod region and reducing the fuel inventory. However, reducing the fuel inventory impedes fuel economy and hence should be avoided.

Accordingly, it is important in development of fuel assemblies having a higher degree of burn-up to realize a new reactivity control method (for reducing an absolute value of the void coefficient and a hot-cold swing) with no need of reducing the fuel inventory.

One reactivity control method without reducing the fuel inventory is to select positions of partial length fuel rods, as disclosed in the above-cited JP, A, 62-276493, JP, A, 64-31089 and U.S. Pat. No. 5,068,082. In one part of U.S. Pat. No. 5,068,082 and JP, A, 64-31089, a plurality of partial length fuel rods are arranged together at positions adjacent to large-diameter water rods or at corners of the lattice array of fuel rods. In another part of U.S. Pat. No. 5,068,082 and JP, A, 62-276493, a plurality of partial length fuel rods are arranged in a row along a diagonal including corners of the lattice array of fuel rods or along a line bisecting each side of the lattice array of fuel rods at its outermost layer. Any of these prior arts intends to promote a neutron moderating effect and reduce both the void coefficient and the hot-cold swing, by making the non-boiling water region (water rod region or gap water region) and the partial length fuel rods adjacent to each other.

With those prior art schemes, a reactivity control capability is improved with a reduction in the reactivity coefficient such as the void coefficient, but sufficient cares have not been paid to change in reactivity itself and a local power peaking depending on positions where partial length fuel rods are set.

More specifically, with the prior arts, singe a plurality of partial length fuel rods are arranged together in such a manner that at least a part of the partial length fuel rods is adjacent to the water rod or the gap water region at the corner, there accompanies a problem that resonance neutrons are absorbed more and the reactivity loss is so increased as to impede fuel economy.

Also, in a cross-section above the partial length fuel rods, there arises a problem that the local power peaking of the fuel rods adjacent to the partial length fuel rods is increased and hence the thermal margin is reduced.

Further, the above-cited prior arts have paid no considerations on how to make, in fuel assemblies aiming a higher degree of burn-up, the cross-sectional area of the water rods optimum in relation to the arrangement of the partial length fuel rods.

Meanwhile, the following has been found from studies conducted by the inventors of this application.

In the case of restrictively arranging or localizing the non-boiling water region, as a moderator, in a fuel assembly that the number of unit lattices in the fuel rod array is increased to $9 \times 9$ or more, localizing the moderator in the outer region of the fuel assembly facing the channel box is more effective (to provide higher sensitivity) than localizing it in the inner region of the fuel assembly facing the water rods for the purpose of improving the reactivity control capability (i.e., making smaller reactivity change due to variations in the void coefficient and hot-to-cold transition, and reducing the void coefficient in its absolute value) (see FIG. 1).

Also, in the case of arranging those fuel rods which have a shorter fuel effective length than ordinary fuel rods, namely, partial length fuel rods, this is effective in a cross-section above the partial length fuel rods for improving the reactivity control capability (i.e., reducing the void coefficient) similarly to the above case of localizing the non-boiling water region. The sensitivity, which represents a rate of reduction in the void coefficient depending on positions where the partial length fuel rods are set, changes in the following order from a higher to lower level (see FIG. 2):

(1) Fuel at corners of an outermost layer of the fuel assembly facing the channel box,
(2) Fuel in the outermost layer of the fuel assembly facing the channel box other than (1),
(3) Fuel in the inner region of the fuel assembly adjacent to the water rods, and
(4) Fuel adjacent to neither the channel box nor the water rods.

Moreover, in the case of arranging the partial length fuel rods in the outermost layer of the fuel rod array, a control rod worth is affected depending on their set positions such that the larger control rod worth is obtained by arranging the partial length fuel rods in the outermost layer at any positions facing the channel box rather than arranging them adjacently to the water rods (see FIG. 3).

Accordingly, by arranging one or more second fuel rods in the form of partial length fuel rods in the outermost layer of the fuel rod array in the square lattice array, an effect of reducing the void coefficient can be obtained to improve the reactivity control capability. An effect of enhancing the control rod worth can also be expected, which contributes to an improvement in safety.

Furthermore, for the case of arranging partial length fuel rods in the outermost layer of the fuel rod array in a fuel assembly that the number of unit lattices in the fuel rod array is increased to $9 \times 9$ or more, the following has been found about an influence of set positions of the partial length fuel rods upon reactivity and a local power peaking from studies conducted by the inventors of this application (see FIG. 4).

When a partial length fuel rod is arranged at a corner position of the outermost layer, the reactivity loss and the local power peaking of that fuel rod which is adjacent to the partial length fuel rod are both large. When a partial length fuel rod is arranged at a lattice position adjacent to the corner position of the outermost layer, the reactivity loss is remarkably improved, but the local power peaking of both the fuel rod adjacent to the partial length fuel rod and the corner fuel rod (i.e., the fuel rod positioned at the corner) remains substantially large. When a partial length fuel rod is arranged at a third lattice position counting from the corner position of the outermost layer, the reactivity loss is further improved, but the local power peaking of both the fuel rod adjacent to the partial length fuel rod and the corner fuel rod is still large. When a partial length fuel rod is arranged at a fourth lattice position counting from the corner position of the outermost layer, i.e., when a partial length fuel rod is arranged inside a projected range of the water rods including both lattice positions at the outermost opposite regions of the projected range, the reactivity loss is almost zero and the local power peaking of both the fuel rod adjacent to the partial length fuel rod and the corner fuel rod is reduced to a large extent.

Consequently, the reactivity loss is reduced by arranging the second fuel rods in the form of partial length fuel rods in the outermost layer of the fuel rod array in a square lattice array other than its corner positions.

Also, the reactivity loss is reduced by arranging the second fuel rods in the outermost layer of the fuel rod array in a square lattice array other than its corner positions and those positions adjacent to the corner positions.

More preferably, when the water rods or neutron moderating rods are projected in two directions orthogonal to each other in the fuel rod array in the square lattice pattern, by arranging the second fuel rods in the outermost layer of the fuel rod array in a lattice pattern inside the projected range including the outermost opposite regions of the projected range, it is possible to reduce both the reactivity loss and the local power peaking, thereby improving fuel economy and a thermal margin.

In addition, the following has been found from studies conducted by the inventors of this application. Specifically, to maximally utilize an effect resulted from localizing the moderator region, ordinary fuel rods are required to be localized. The localization of the ordinary fuel rods reduces probability that resonance neutrons are absorbed, and hence contributes to a further improvement in fuel economy.

If, among the fuel rods inside the outermost layer of the fuel rod array in the square lattice pattern and arranged in a layer adjacent to the outermost layer, those fuel rods adjacent to the second fuel rods in the outermost layer are the first fuel rods, the region of the first fuel rods is surrounded by the moderator region and, as a result, thermal neutrons efficiently decelerated through the moderator region are caused to flow into the region of the first fuel rods with higher efficiency. Therefore, resonance absorption is reduced to improve not only the reactivity control capability but also fuel economy. This effect is further enhanced by making the region, where the first fuel rods are arranged, spread over one entire layer adjacent to the outermost layer, and is still further enhanced by making that region spread over two layers adjacent to the outermost layer.

Meanwhile, preferably, by arranging, inside the outermost layer of the fuel rod array in the lattice pattern, one or more third fuel rods in the form of partial length fuel rods in a layer adjacent to the outermost layer at its corners, there is obtained an effect of rendering distribution of a coolant flow rate and distribution of a vapor volume rate more uniform within the channel box. In the region facing the channel box, particularly, in the region near its corners, friction resistance is generally so large that the coolant flow rate tends to decrease. This tendency can be overcome by arranging the partial length fuel rods at respective corners of the layer adjacent to the outermost layer.

Incidentally, the expression "A is adjacent to B" used here in connection with the arrangement of fuel rods implies all such conditions that A is adjacent to B not only in the row and column directions, but also in oblique directions.

Further, based on studies conducted by the inventors of this application, the following has been found about how fuel economy is affected by localizing the moderator region (i.e., the non-boiling water region), and how the cross-sectional area and shape of water rods are made optimum.

For a fuel assembly that the number of unit lattices in the fuel rod array is increased to $9 \times 9$ or more, comparing the case of enlarging the water rod region inside the fuel rod assembly and the case of enlarging the gap water region outside the fuel rod assembly on a condition that the fuel inventory is kept constant, the water rod region is more effective (to provide higher sensitivity) than the gap water region in a point of increasing a neutron infinite multiplication factor (i.e., improving fuel economy). Accordingly, the cross-sectional area of the water rods requires to be enlarged for an improvement in fuel economy (see FIG. 5). In this case, an optimum range of the cross-sectional area of the water rods is from 7 to 14 $cm^2$.

Making the cross-sectional area of the water rods optimum is also related to stability. Stability is evaluated in terms of two modes; i.e., channel stability and core stability. An increase in both the uranium inventory and the cross-sectional area of the water rods reduces a margin of the channel stability, while an increase in the uranium inventory and a decrease in the cross-sectional area of the water rods degrades the core stability. Therefore, the allowable zone from the viewpoint of stability ranges from 9 to 11 $cm^2$ in terms of the cross-sectional area of the water rods, the range being defined by a limit line of the channel stability and a limit line of the core stability (see FIG. 6).

To enlarge the cross-sectional area of the water rods, adopting a large-size water rod is advantageous in reducing the number of fuel rods which must be sacrificed, and reducing the coolant flow passage area which is less effective to cool fuel rods (i.e., increasing a critical power). Assuming that the spacings between the water rods and the fuel rods adjacent to the water rods are constant, it is most preferable in the case of circular water rods to use the unit lattices of $2 \times 2$ as a water rod for effective utilization of the space.

Therefore, preferably, by setting the moderator's cross-sectional area of one or more neutron moderating rods to the range of 7 to 14 $cm^2$ the reactivity is enhanced and fuel economy is further improved. Also, by setting the moderator's cross-sectional area of the neutron moderating rods to the range of 9 to 11 $cm^2$ the channel stability, the core stability, as well as fuel economy are improved. Additionally, the improved stability renders equipment installed for higher stability unnecessary.

Moreover, by arranging the neutron moderating rods in such a region as able to accommodate 7 to 12 fuel rods, and locating the water rod region such that two or more of four lattice positions adjacent to each of the fuel lattice positions in the water rod region are those positions where the water rod region adjoins, a large-size circular water rod with the size corresponding to $2 \times 2$ cells can be arranged three or four in a fuel assembly having the fuel rod array of $10 \times 10$, and two in a fuel assembly having the fuel rod array of $9 \times 9$. Therefore, the coolant flow passage area which is less effective to cool fuel rods is diminished and the critical power is increased.

In addition, the following has been found by considering the above results of the studies together. Arranging the partial length fuel rods adjacently to the water rods is substantially equivalent to enlarging the water rod region at the center of the fuel assembly and, therefore, has an effect of increasing a neutron infinite multiplication factor of the fuel assembly. Also, by making the number of the partial length fuel rods adjacent to the channel box larger than the number of partial length fuel rods adjacent to the water rods, the number of partial length fuel rods required in terms of the reactivity control capability can be cut down, which provides an effect of increasing the control rod worth.

Therefore, preferably, by arranging one or more third fuel rods in the form of partial length fuel rods adjacently to the neutron moderating rods, the neutron infinite multiplication factor is further increased and both the reactivity and fuel economy are improved. Also, preferably, by making the number of second fuel rods arranged in the outer layer of the fuel rod array in a square lattice array larger than the number of third fuel rods given by the partial length fuel rods arranged adjacently to the neutron moderating rods, the number of partial length fuel rods used can be cut down while ensuring a necessary level of the reactivity and increasing the control rod worth.

In addition, it has been found from studies conducted by the inventors of this application that, by arranging the partial length fuel rods adjacently to each other, there can be obtained a greater effect of improving both the reactivity control capability and the control rod worth than resulted from summing an effect obtainable with one partial length fuel rod alone.

Therefore, preferably, by arranging two second fuel rods in the form of partial length fuel rods in at least one side of the outermost layer of the fuel rod array in a square lattice pattern, the effect of enhancing both the reactivity control capability and the control rod worth is doubled. Also, by arranging those two second fuel rods adjacently to each other, there can be obtained an effect twice or more as much as that in the case of arranging two second fuel rods not adjacently to each other, in point of enhancing both the reactivity control capability and the control rod worth.

Additionally, it has been found from studies conducted by the inventors of this application that, to improve the channel stability and the core stability, upper ends of the partial length fuel rods are advantageously positioned at a level from 4th-stage spacer to 6th-stage spacer. This spacer level corresponds to $\frac{1}{2}$-$\frac{3}{4}$ in terms of a ratio of the fuel effective length to the full fuel rod length.

Therefore, preferably, by setting the second fuel rods in the form of partial length fuel rods to have a fuel effective length in a range of $\frac{1}{2}$ to $\frac{3}{4}$ of that of the ordinary fuel rods, there can be obtained an effect of improving the channel stability and core stability.

Reactor cores are primarily grouped into C lattice cores of the type that the gap water region on the side, through which a crucial control rod is inserted, has the same gap width as that of the gap water region on the opposite side, and D lattice cores of the type that the gap water region on the side, through which a cross-shaped control rod is inserted, has a larger gap width than that of the gap water region on the opposite side.

Preferably, by arranging second fuel rods at least one for each of two adjacent sides of the outermost layer of the fuel rod array in a square lattice pattern, there can obtained a fuel assembly suitable for being loaded into D lattice cores.

A spectral shift rod can adjust a neutron moderating effect with a water level therein changed depending on the core flow rate and, as a result, it can be utilized to control reactivity or power. Meanwhile, in a BWR fuel assembly, burn-up reactivity is generally controlled by gadolinia. To effectively perform reactivity control or power control with a water level in the spectral shift rod, the amount of gadolinia requires to be reduced. Since the reactivity control effect is enhanced and the shutdown margin is improved by arranging the partial length fuel rods, the amount of gadolinia can be reduced. As a result, it is possible to improve fuel economy and achieve the best use of an effect of the spectral shift rod.

If the number of unit lattices in the fuel rod array is increased from 8×8 to 9×9 or more, the number of layers of fuel rods constituting a fuel assembly is enlarged and hence time degree of freedom in layout for distributing the fuel rods in the fuel assembly is increased. Accordingly, fuel or moderators can be localized in the fuel assembly, meaning that the above-explained arrangement can easily be realized. Incidentally, the term "localization (localized or localizing" used herein implies that, in the fuel or moderator region surrounded by boundary lines between fuel and moderators, the length of the boundary lines per unit volume is shortened.

Finally, a method of loading fuel assemblies according to the present invention will now be described. The fuel assembly (first fuel assembly) of the present invention has a feature that, since many partial length fuel rods are used, the fuel inventory largely varies in the axial direction. Accordingly, supposing a retrofitted core based on an existing core in which conventional fuel assemblies (second fuel assemblies) are loaded, an effect of axial neutron flux distribution due to an axial difference in fuel inventory must be taken into consideration. If the first fuel assembly is loaded among the second fuel assemblies having no partial length fuel rods or the smaller number of partial length fuel rods than the first fuel assembly, there is found a tendency for the second fuel assemblies to increase the power in a core lower portion and, on the contrary, for the first fuel assembly to increase the power in a core upper portion.

With the method of loading fuel assemblies according to the present invention, the first fuel assemblies and the second fuel assemblies are loaded in the core central portion and the core circumferential portion such that the first fuel assemblies have a smaller loading ratio in the core central portion than in the core circumferential portion, whereby the linear power generation rate can be held not larger than a set value.

DETAILED DESCRIPTION OF PREFERRED EMBODIMENTS

Hereinafter, preferred embodiments of the present invention will be described with reference to the drawings.

First Embodiment

A description will be given of a first embodiment of the present invention by referring to FIGS. 7 to 11.
(Construction)

Figure 7:
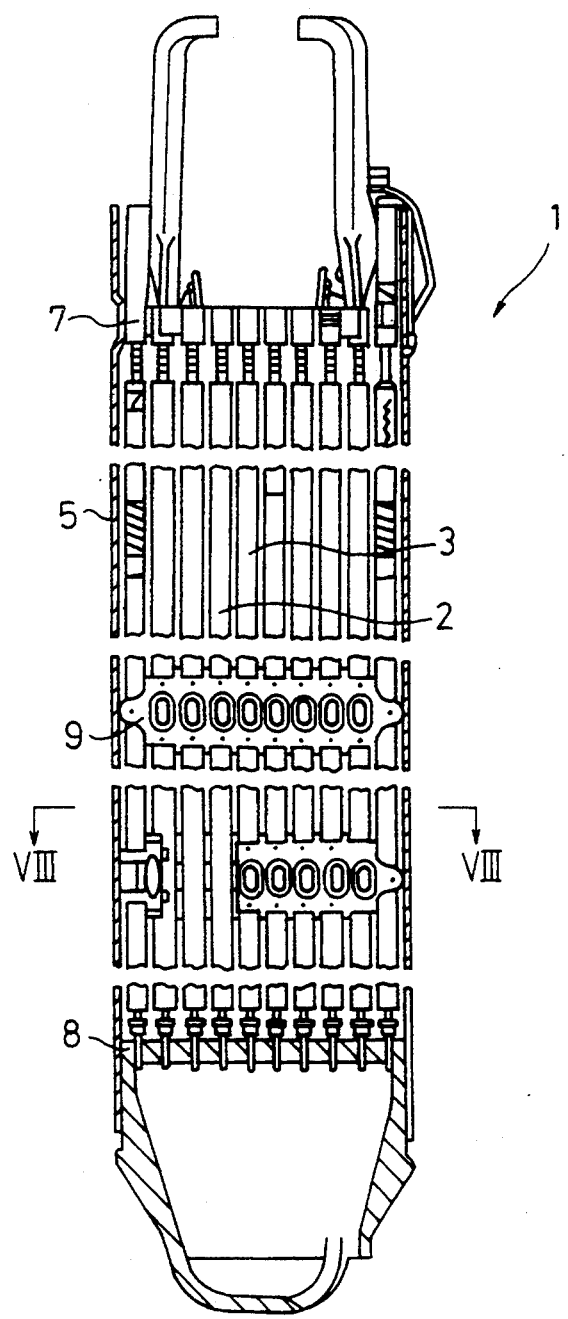
FIG. 7 is a vertical sectional view of a fuel assembly according to a first embodiment of the present invention.

A fuel assembly 1 of this embodiment shown in FIG. 7 is used for a boiling water reactor and loaded into a core of the boiling water reactor. The fuel assembly 1 of this embodiment comprises three water rods 4 (see FIG. 8), fuel rods 2, and partial length fuel rods 3. The water rods 4 and the fuel rods 2 have their upper ends supported by an upper tie plate 7, while the water rods 4, the fuel rods 2 and the partial length fuel rods 3 have their lower ends supported by a lower tie plate 8. The water rods 4 and the fuel rods 2 are tightly held at seven intermediate locations by 1st- to 7th-stage fuel spacers 9. The partial length fuel rods 3 are tightly held at their upper ends by the 5th-stage fuel spacer 9 and at four intermediate locations by 1st- to 4th-stage fuel spacers 9. A channel box 5 encloses the whole of a fuel bundle built up by the water rods 4, the fuel rods 2, the partial length fuel rods 3, the upper tie plate 7, the lower tie plate 8, and the fuel spacers 9, as mentioned above. The channel box 5 is attached to the upper tie plate 7.

Figure 8:
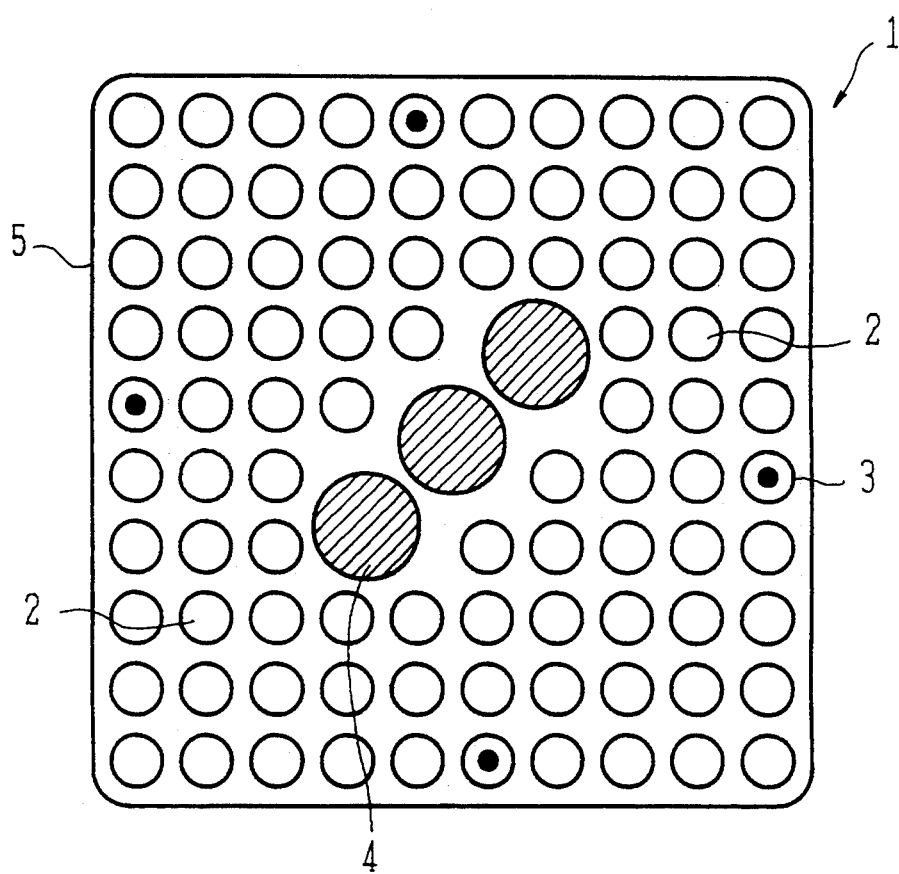
FIG. 8 is a cross-sectional view taken along line VIII—VIII in FIG. 7.

A number of fuel rods including the fuel rods 2 and the partial length fuel rods 3 are, as shown in FIG. 8, arrayed in a square lattice pattern of 10×10. Of these fuel rods, fours given by the partial length fuel rods 3 are arranged in an outermost layer of the fuel rod array. The three large-diameter water rods 4 are circular in cross-section and diagonally arranged in a lattice region of 4×4 at the center of the fuel rod array. The bundle of these fuel rods 2, the partial length fuel rods 3 and the water rods 4 are surrounded by the channel box 5 having a rectangular cross-section. The total number of fuel rods 2 and the partial length fuel rods 3 is 90.

Figure 14:
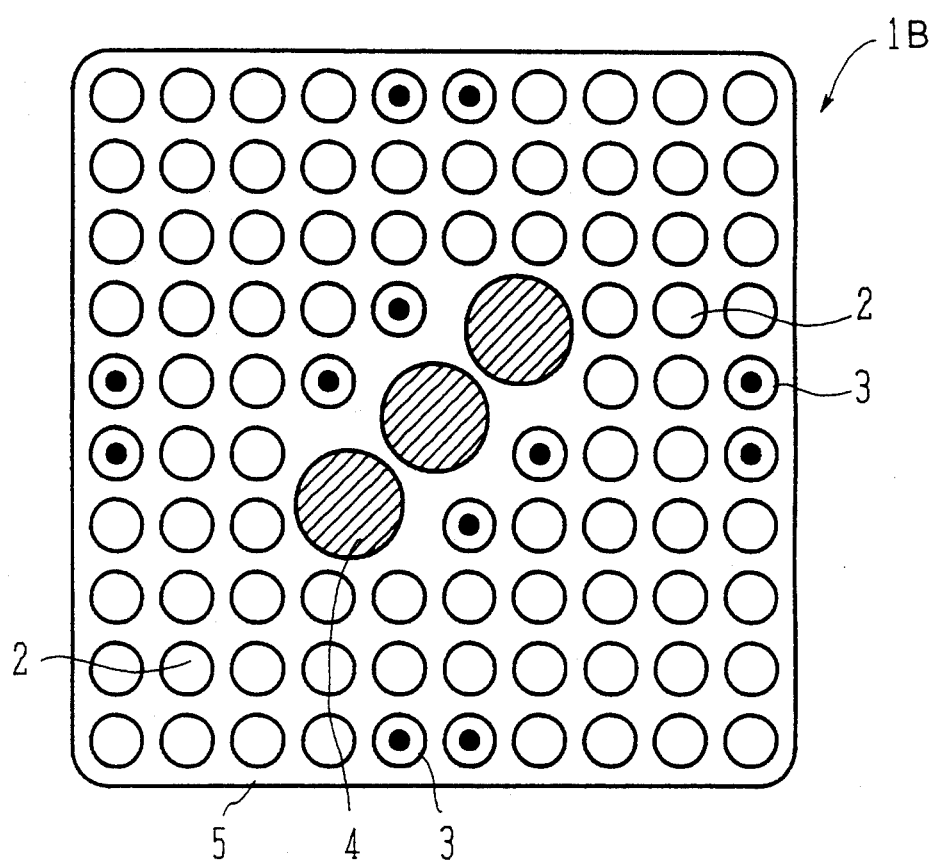
FIG. 14 is a cross-sectional view of a fuel assembly according to a third embodiment of the present invention.

Such a fuel assembly having the fuel rod array of 10×10 and including three large-diameter water rods arranged at the center thereof is illustrated in FIG. 14 of JP, A, 63-311195. However, FIG. 14 of JP, A, 63-311195 has no suggestions about the arrangement of partial length fuel rods.

The partial length fuel rods 3 each have a fuel effective length shorter than that of the fuel rods 2. Specifically, the fuel effective length of the partial length fuel rods 3 is 15/24 of that of the fuel rods 2. This length corresponds to a level of the 5th-stage fuel spacer 9 counting from the bottom, by which the upper ends of the partial length fuel rods 3 are supported. Assuming that, based on the concept of a matrix in mathematics, a lateral line of the fuel rod array in the square lattice pattern is called a row, a perpendicular line thereof is called column, and a position of a unit lattice on the i-th row from the top and the j-th column from the left, as viewed in the drawing, is expressed by (i, j), the partial length fuel rods 3 are arranged at the lattice positions of (1, 5), (5, 1), (6, 10) and (10, 6). In other words, the partial length fuel rods 3 are arranged one in each side of the outermost layer of the fuel rod array in the square lattice pattern such that they are symmetrical with respect to both of two diagonal lines of the fuel assembly 1. Inside the outermost layer of the fuel rod array in the square lattice pattern, there are arranged only ordinary fuel rods 2 in total two layers; i.e., a layer adjacent to the outermost layer and a layer adjacent to the former layer.

The three large-diameter water rods 4 are arranged in a lattice region of 4×4 at the center of the fuel rod array in such a manner that they occupy a space capable of accommodating 10 fuel rods and lie in a diagonal line of the fuel assembly with a small spacing therebetween. In the remaining space within the lattice region of 4×4 at the center of the fuel rod array, there are arranged six fuel rods 2. The water rods 4 each have an outer diameter of 20.7 mm and, therefore, the total cross-sectional area of the water rods is about 9 cm$^2$, taking into account a wall thickness of the water rods 4. Each of the lattice positions where the water rods 4 are arranged is such that two or more of four lattice positions adjacent to each of the lattice positions are those positions where the water rods 4 are arranged. Also, the outermost lattice positions occupied by the three water rods 4 are (4, 7) and (7, 4) on a diagonal line of the lattice region of 4×4. Thus, the water rods occupy the fourth to seventh rows extending in the row direction (i.e., in the lateral direction) and the fourth to seventh columns extending in the column direction (i.e., in the perpendicular direction). The partial length fuel rods 3 are located within the range of those rows or columns. Stated otherwise, when the water rods 4 are projected in the row and column directions, the partial length fuel rods 3 are arranged in lattice positions in the outermost layer of the fuel rod array in the square lattice pattern inside a projected range of the water rods including the lattice positions at the outermost opposite regions of the projected range.

Figure 9:
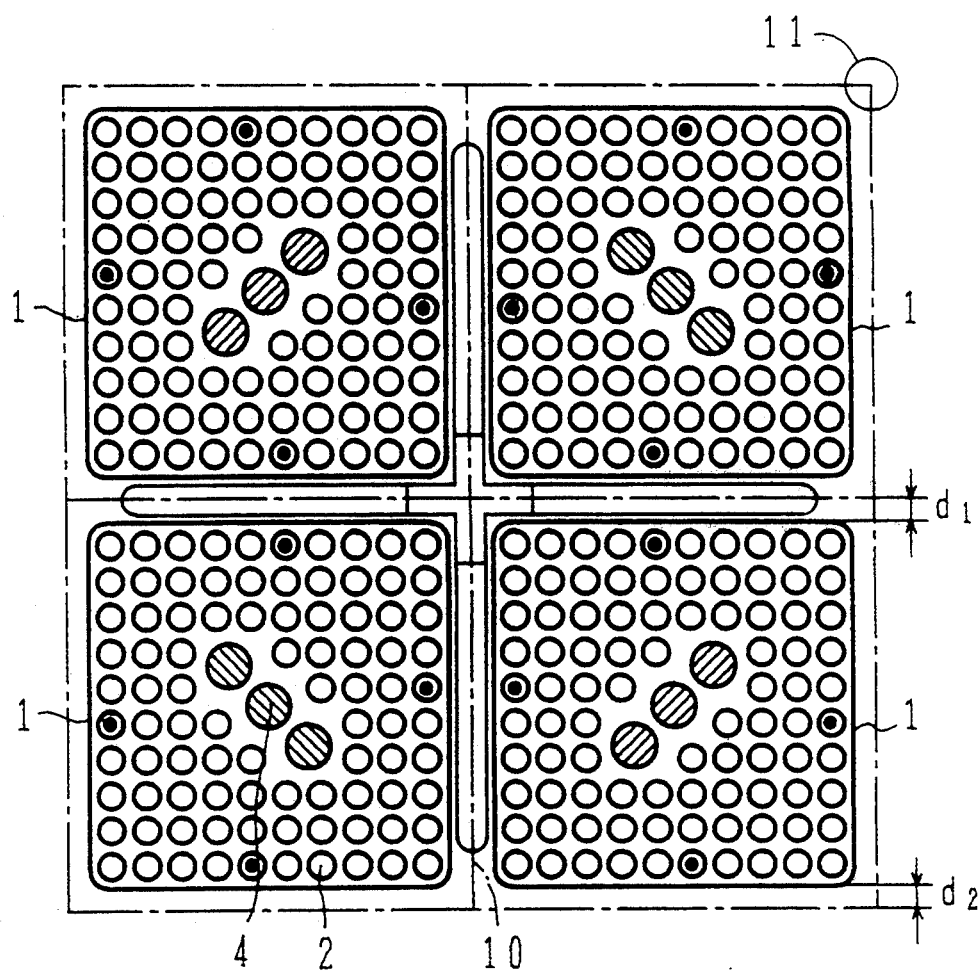
FIG. 9 is a view showing layout of the fuel assembly of FIG. 7 in a core.

The fuel assembly 1 is arranged in the core as shown in FIG. 9. More specifically, total four fuel assemblies 1 are arranged around a single control rod 10 having a crucial cross-section. These four fuel assemblies 1 surrounding the single control rod 10 jointly build up one fuel unit. A core of a boiling water reactor includes a number of such fuel units. A neutron detecting counter 11 is disposed near one corner of each fuel unit. The control rod 9 is inserted to a water gap region defined between the four fuel assemblies 1.
(Operation)

Operation of this embodiment will be described below.

Since the number of unit lattices in the fuel rod array is increased from 8×8 in the prior art to 10×10, the degree of freedom in layout for distributing the fuel rods in the fuel assembly is increased. Accordingly, fuel or moderators can be localized in the fuel assembly. The term "localization (localized or localizing)" used herein implies that, in the fuel or moderator region surrounded by boundary lines between fuels and moderators, the length of the boundary lines per unit volume is shortened.

Figure 1:
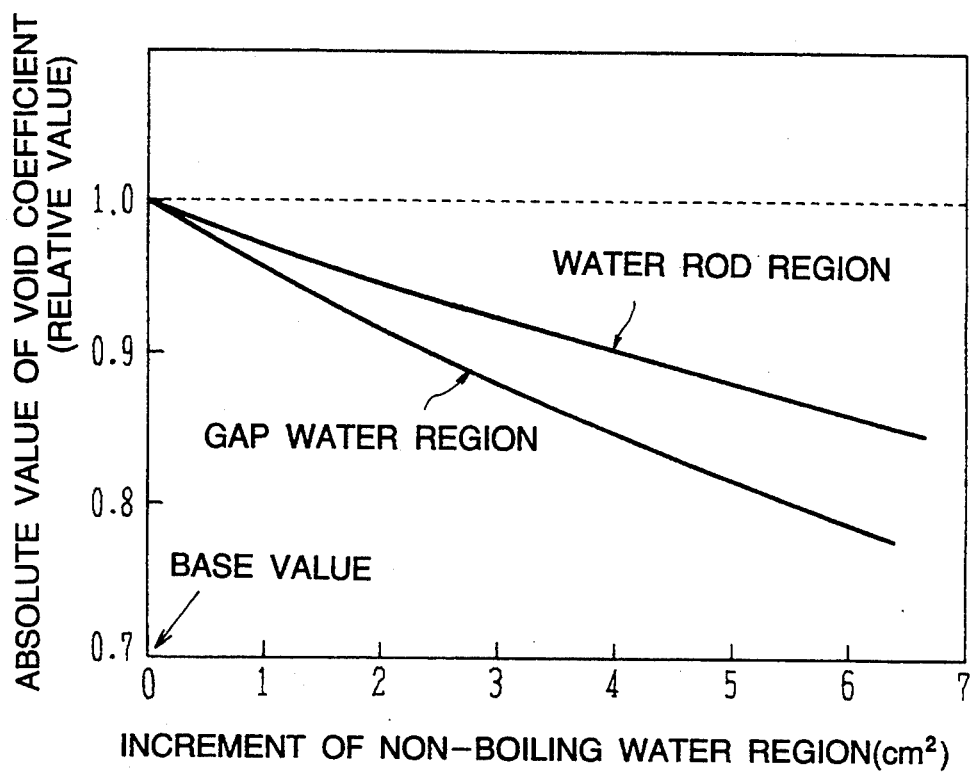
FIG. 1 is a graph showing an effect of reducing a void coefficient (absolute value) with an increase in the moderator region.

A description will be given of an effect that the localized position of the moderator region (i.e., the non-boiling water region) imposes a reactivity control capability (i.e., a reduction in reactivity change due to variations of the void coefficient and hot-to-cold transition of the reactor). FIG. 1 comparatively shows variations of the void coefficient as resulted when the water rod region (i.e., a moderator in the inner region) is enlarged and when the gap water region (i.e., a moderator in the outer region) is enlarged, on a condition that the fuel inventory is kept constant. It will be understood from FIG. 1 that, for the purpose of improving the reactivity control capability, localizing the moderator in the outer region of the fuel assembly facing the channel box is more effective (to provide higher sensitivity) than localizing it in the inner region of the fuel assembly facing the water rods.

Figure 2:
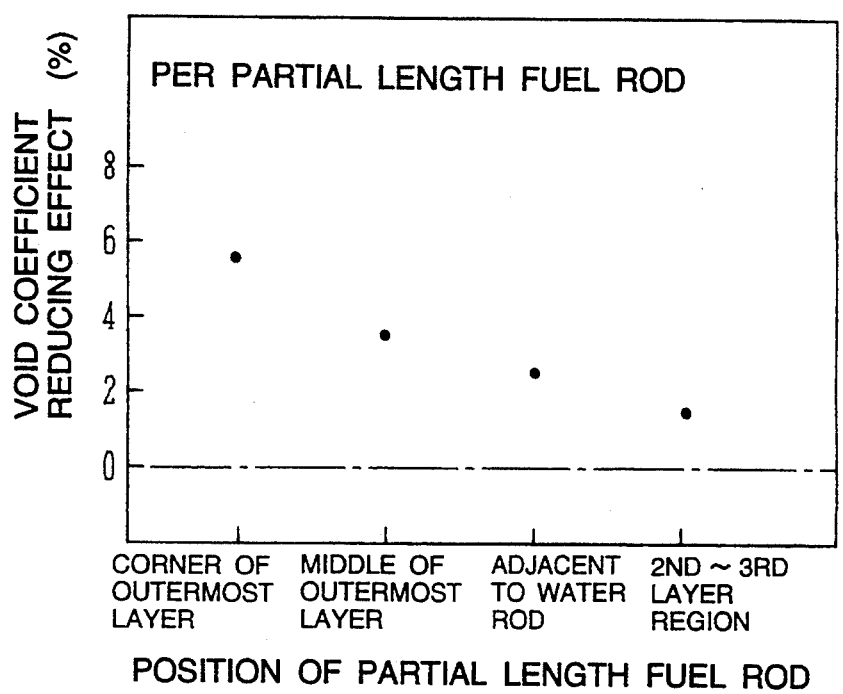
FIG. 2 is a characteristic graph showing the relationship between positions of a partial length fuel rod and an effect of reducing a void coefficient (absolute value).

FIG. 2 shows variations of the void coefficient in a cross-section above the partial length fuel rods depending on positions where the partial length fuel rods are arranged. It will be seen from FIG. 2 that the sensitivity representing a rate of reduction in the void coefficient changes in the following order from a higher to lower level:

(1) Fuel at corners of an outermost layer of the fuel assembly facing the channel box,
(2) Fuel in the outermost layer of the fuel assembly facing the channel box other than (1),
(3) Fuel in the inner region of the fuel assembly adjacent to the water rods, and
(4) Fuel adjacent to neither the channel box nor the water rods.

This means that, similarly to the localization of the non-boiling water region explained above referring to FIG. 1, localizing the moderator region (i.e., arranging the partial length fuel rods adjacently to the non-boiling water region) is also effective for the reactivity control. This effect is more remarkable in an upper region of the core (i.e., a region of higher void coefficient) in which the ratio of hydrogen to the number of heavy metal atoms (H/U) is small and the sensitivity representing the magnitude of a neutron moderating effect is high.

For the above reason, in this embodiment, the fuel rods 2 and the partial length fuel rods 3 are arrayed in a square lattice pattern of 10×10, and the partial length fuel rods 3 are arranged in the outermost layer of the fuel rod array. As a result, an effect of reducing the void coefficient can be obtained to improve the reactivity control capability.

Figure 4:
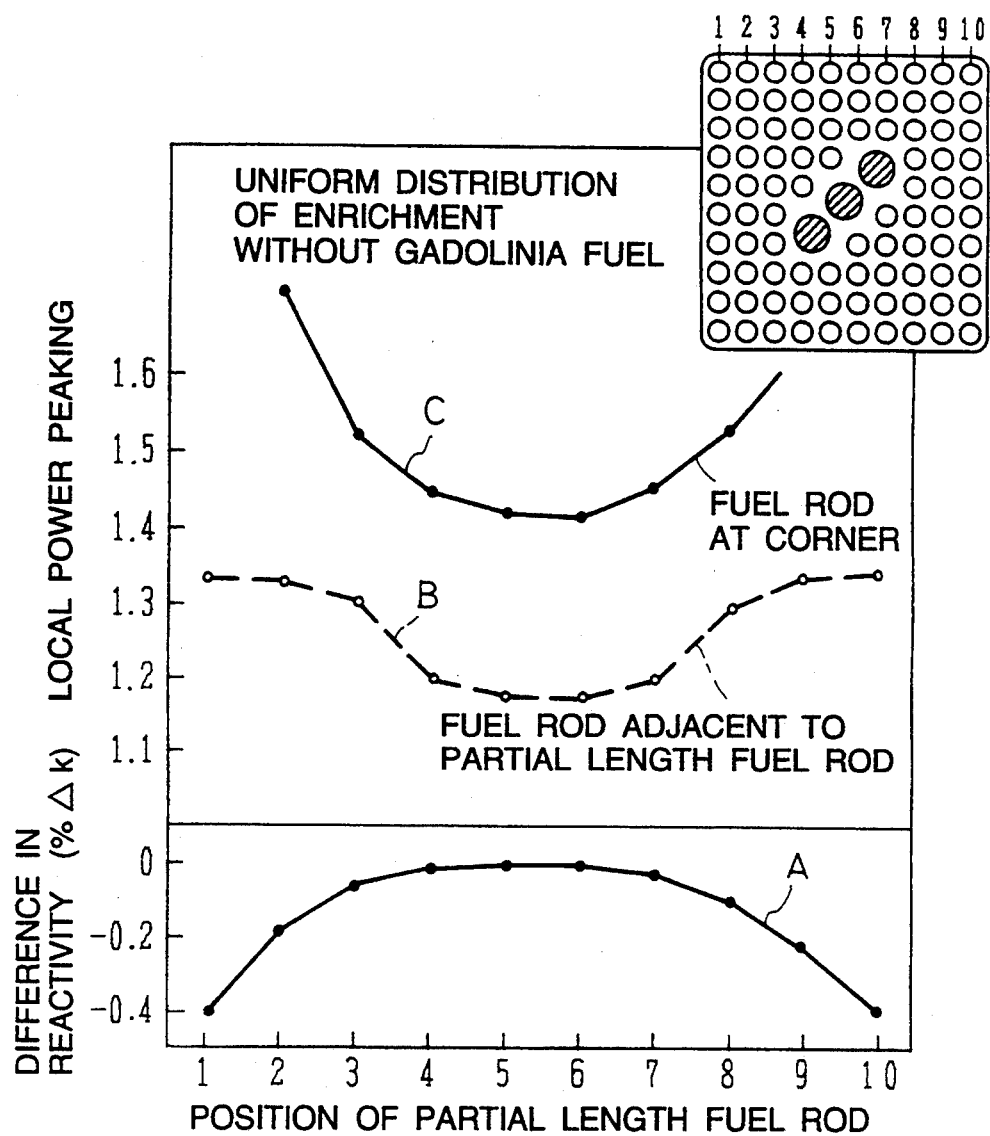
FIG. 4 is a characteristic graph showing the relationship of positions of a partial length fuel rod versus change in reactivity and a local power peaking.

A description will be given of, in the case of arranging partial length fuel rods in the outermost layer of the fuel rod array, how positions of the partial length fuel rods affect reactivity and a local power peaking. FIG. 4 shows the relationship respective positions of the partial length fuel rods versus a neutron infinite multiplication factor (curve A) and a local power peaking (curves B and C) in a cross-section above the partial length fuel rods as resulted when the position of the partial length fuel rod is changed from (1, 1) to (1, 10) along the upper side of the fuel rod assembly as illustrated where the four partial length fuel rods are arranged in the outermost layer facing the channel box in symmetrical relation as with the above embodiment. Also, similarly to the above embodiment, the fuel rods are arrayed in a lattice pattern of 10×10 and three water rods are arranged in a lattice region of 4×4 at the center of the fuel rod array in such a manner that they occupy a space capable of accommodating 10 fuel rods. Note that the curve A represents a difference in reactivity with a reference set to the reactivity obtained when the partial length fuel rod is positioned at (1, 5) in the upper side illustrated. The curve B represents a local power peaking coefficient of the ordinary fuel rod adjacent to the partial length fuel rod when the partial length fuel rod is arranged at a corner of the fuel rod array, and a local power peaking coefficient of the ordinary fuel rod adjacent to the partial length fuel rod at its left side as viewed in the drawing in other cases. The curve C represents a local power peaking coefficient of the ordinary fuel rod arranged at the corner of the fuel rod array.

As will be seen from FIG. 4, when the partial length fuel rod is arranged at the corner of the fuel rod array in the outermost layer thereof, the reactivity loss is large and the local power peaking of that fuel rod adjacent to the partial length fuel rod is also large. When the partial length fuel rod is arranged at a lattice position adjacent to the corner in the outermost layer, e.g., at (1, 2) along the upper side as illustrated, the reactivity loss is remarkably improved. On the contrary, the local power peaking of both the fuel rod adjacent to the partial length fuel rod and the fuel rod at the corner remains substantially large. When the partial length fuel rod is arranged at a third lattice position counting from the corner in the outermost layer including the corner, e.g., at (1, 3) along the upper side as illustrated, the reactivity loss is further improved, but the local power peaking of both the fuel rod adjacent to the partial length fuel rod and the fuel rod at the corner position is still large. When the partial length fuel rod is arranged at a fourth or still inner lattice position counting from corner in the outermost layer including the corner, e.g., at (1, 4) or any innerer position along the upper side as illustrated, the reactivity loss is almost zero and the local power peaking of both the fuel rod adjacent to the partial length fuel rod and the fuel rod at the corner is reduced to a large extent.

For that reason, in this embodiment, the partial length fuel rods 3 are each arranged in the lattice positions in the outermost layer of the fuel rod array inside the projected range of the waiter rods, including the lattice positions in the outermost opposite regions of the projected range. With such an arrangement, the reactivity loss and the local power peaking can be both suppressed, thus resulting in an improvement in fuel economy and a thermal margin. If the local power peaking is reduced by another measure, it would be sufficient to take into account a reduction in the reactivity loss alone. In this case, the partial length fuel rod may be arranged at the lattice position adjacent to the corner in the outermost layer, or at the third lattice position counting from the corner in the outermost layer including the corner.

Figure 3:
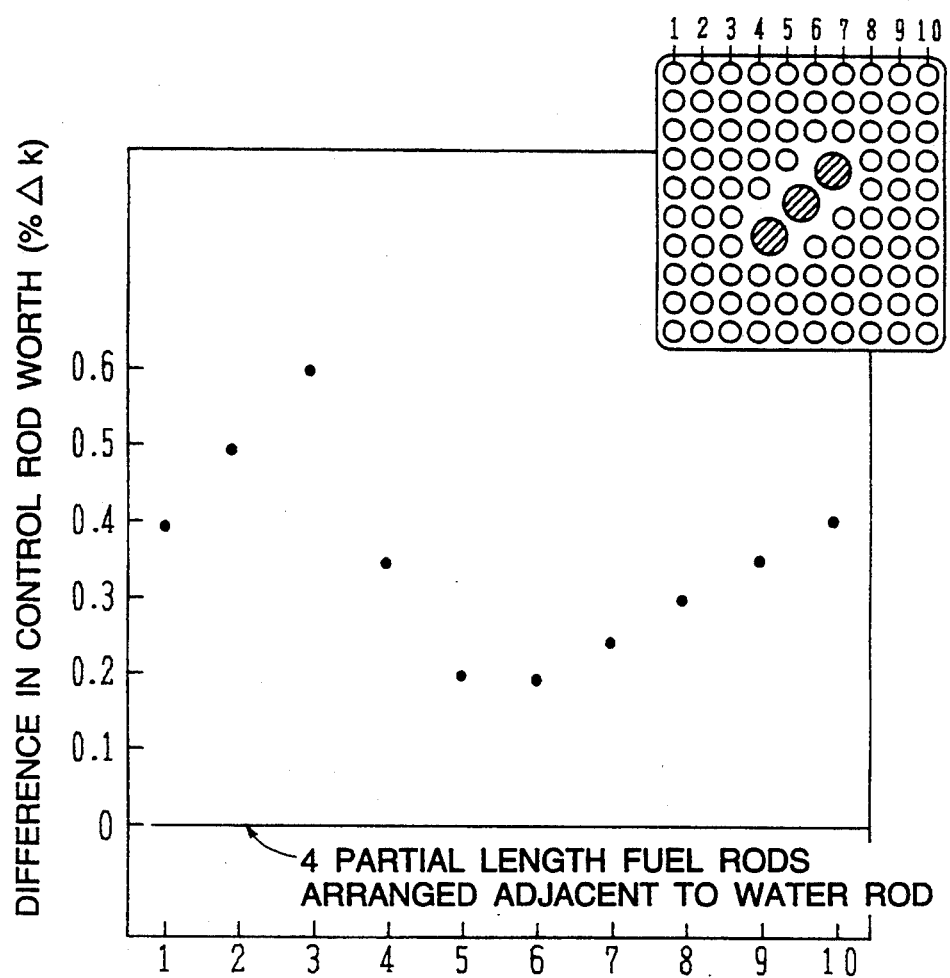
FIG. 3 is a characteristic graph showing the relationship of between positions of a partial length fuel rod and a control rod worth.

A description will be given of, in the case of arranging the partial length fuel rods in the outermost layer of the fuel rod array, how positions of the partial length rods affect a control rod worth. FIG. 3 shows the relationship between respective positions of the partial length fuel rods and a control rod worth in a cross-section above the partial length fuel rods as resulted when the position of the partial length fuel rod is changed from (1, 1) to (1, 10) along the upper side of the fuel rod assembly as illustrated where the four partial length fuel rods are arranged in the outermost layer facing the channel box in symmetrical relation as with the above embodiment. The control rod worth is represented by a difference from a reference value obtained when the partial length fuel rods in the same number are positioned adjacently to the water rods. As will be seen from FIG. 3, the larger control rod worth is obtained by arranging the partial length fuel rods in the outermost layer at any positions facing the channel box rather than arranging them adjacent to the water rods. This is attributable to an increase in thermal neutron flux near the control rod (particularly, an absorption rod).

Accordingly, with this embodiment, by arranging the partial length fuel rods 3 in the outermost layer of the fuel rod array, an effect of enhancing the control rod worth can be expected, which contributes to an improvement in safety.

In order to maximally utilize an effect resulted from localizing the moderator region, ordinary fuel rods (the fuel rods 2) are required to be localized. The localization of the ordinary fuel rods reduces probability that resonance neutrons are absorbed, and hence contributes to a further improvement in fuel economy. In this embodiment, the partial length fuel rods 3 are arranged in the outermost layer of the fuel rod array in a square lattice pattern and, while only the ordinary fuel rods 2 are arranged in a layer adjacent to the outermost layer inside thereof at those lattice positions (fuel rod positions) adjacent to the partial length fuel rods and the water rods 4 are concentratedly arranged at the center, so that the region of the fuel rods 2 is surrounded by the moderator region. As a result, thermal neutrons efficiently decelerated through the moderator region are caused to flow into the region of the fuel rods 2 with higher efficiency. Therefore, resonance absorption is reduced to improve not only the reactivity control capability but also fuel economy. This effect is further enhanced by making the region, where only the fuel rods 2 are arranged, spread over one entire layer adjacent to the outermost layer, and is still further enhanced by making that region spread over two layers adjacent to the outermost layer as with this embodiment.

A description will be given of how fuel economy is affected by localizing the moderator region (i.e., the non-boiling water region), and how the cross-sectional area and shape of water rods are made optimum.

Figure 5:
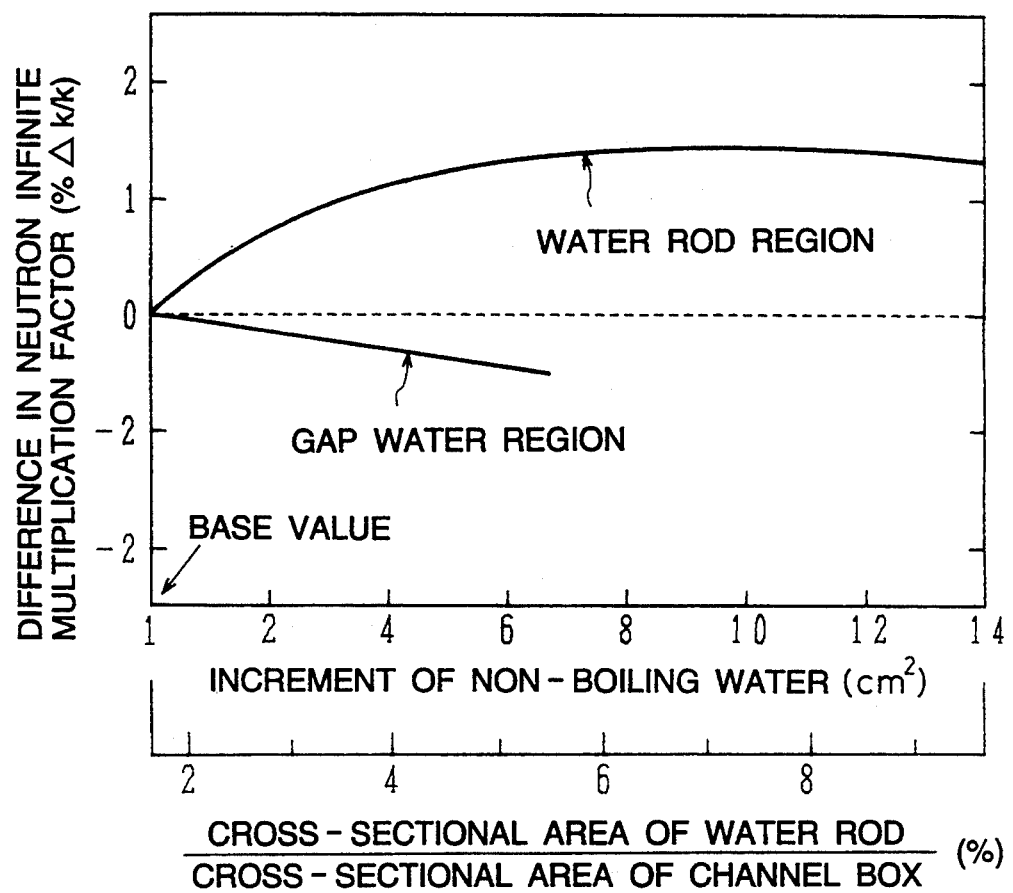
FIG. 5 is a characteristic graph showing an effect of enhancing reactivity with an increase in the moderator region.

FIG. 5 comparatively shows change in reactivity as resulted when the water rod region (i.e., a moderator in the inner region) is enlarged and when the gap water region (i.e., a moderator in the outer region) outside the channel box is enlarged, on a condition that the fuel inventory is kept constant in a fuel assembly that the number of unit lattices in the fuel rod array is increased to 10×10. The horizontal axis represents two parameters; namely, an increment of the water rod region or gap water region (i.e., an increment of the non-boiling water region), and a percentage of a cross-sectional area of the water rods with respect to a cross-sectional area of the channel box depending on such an increment of the water rod region. The vertical axis represents a difference in a neutron infinite multiplication factor with a reference set to 3 cm$^2$ (1.7%) that is a cross-sectional area of water rods in the existing fuel assembly. It will be seen from FIG. 5 that, for the purpose of increasing the neutron infinite multiplication factor, i.e., improving the reactivity or fuel economy, enlarging the water rod region inside the fuel rod assembly is more effective (to provide higher sensitivity) than enlarging the gap water region outside the fuel rod assembly facing the channel box. This is attributable to that thermal neutrons are less absorbed by the moderator with flattening in distribution of thermal neutron flux. The flattening in distribution of thermal neutron flux is also important in a point of ensuring a thermal margin because it affects not only fuel economy but also local power distribution.

Thus, in the fuel assembly of 10×10 lattice, enlarging the cross-sectional area of the water rods is effective for an improvement in fuel economy. Therefore, the cross-sectional area of the water rods requires to be enlarged from the current value of 3 cm$^2$ (1.7%).

On the other hand, enlarging the number of unit lattices occupied by the water rod region reduces the number of fuel rods capable of being loaded, and hence is contradictory to a higher degree of burn-up. Taking into account symmetry of the fuel assembly, a proper range of the number of unit lattices occupied by the water rod region is from 2, the current number, to 8–16. In consideration of that an area of a unit lattice in the fuel assembly of 10×10 lattice is about 60% of that in the existing fuel assembly of 8×8 lattice and, as mentioned above, the number of unit lattices occupied by the water rod region is 4 to 8 times as many as the current number, the cross-sectional area of the water rods appropriately ranges from 7 to 14 cm$^2$.

For the above reason, in this embodiment, the total cross-sectional area of the three water rods 4 is set to about 9 cm$^2$, which also contributes to higher reactivity and improved fuel economy.

Making the cross-sectional area of the water rods optimum is further related to stability. Stability is evaluated in terms of two modes; i.e., channel stability and core stability. The channel stability must be kept to prevent oscillation of flow rate distribution of a coolant or cooling water, and is evaluated for that fuel assembly which has the highest power in the core. The core stability must be kept to prevent an unstable phenomenon upon coupling between neutron flux and thermal-hydraulic vibration in the core. A limit value of each stability is represented by a reduction ratio. Thus, the channel stability and the core stability are both controlled so that the reduction ratio is held not larger than 1.0.

Figure 6:
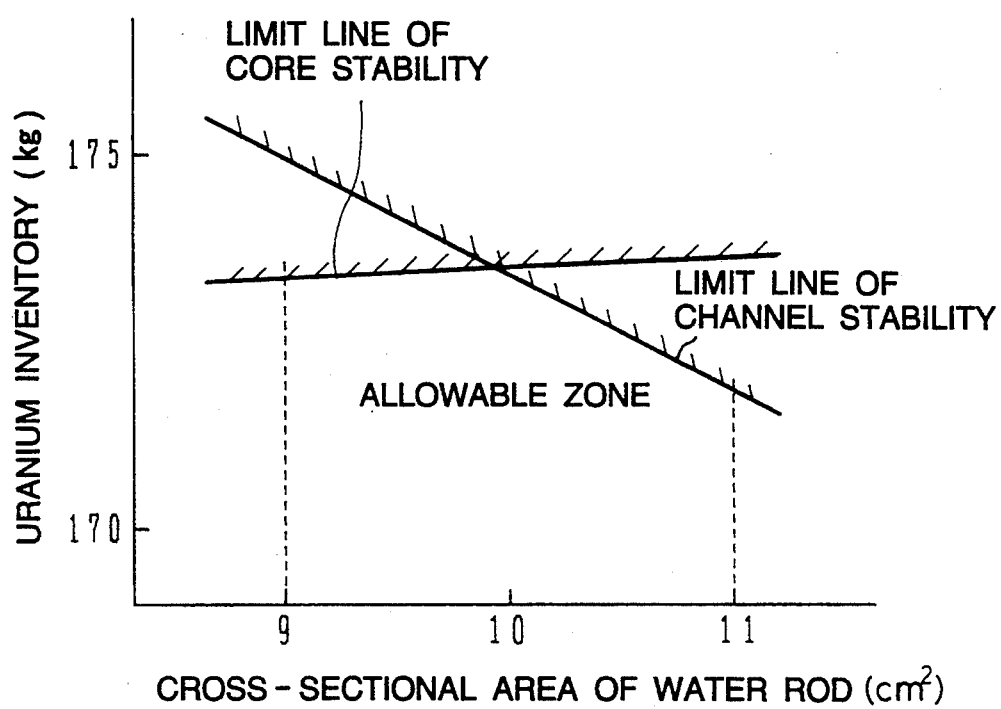
FIG. 6 is a characteristic graph showing a stability map in a fuel assembly having a fuel rod array of 10×10.

In view of the above, the inventors of this application have studied stability of the fuel assembly of 10×10 lattice. FIG. 6 shows a limit line for each type of stability on a map indicating a uranium inventory and the cross-sectional area of the water rods. The uranium inventory implies the amount of uranium capable of being loaded for each fuel assembly, and the larger uranium inventory means an increase in the outer diameter of each fuel rod. On the other hand, the cross-sectional area of the water rods represents a cross-sectional area of water passage(s) in one or more water rods positioned in the fuel assembly, and the larger the cross-sectional area of the water rods means an increase in the outer diameter of each water rod. Accordingly, an increase in the uranium inventory and the cross-sectional area of the water rods makes the outer diameter of the fuel rods and the water rods larger and hence diminishes an flow passage area in the fuel assembly, whereby the flow resistance is enlarged and a margin of the channel stability is reduced. As shown in FIG. 6, therefore, the channel stability becomes marginal in the region where the cross-sectional area of the water rods is large and the uranium inventory is also large, and a limit line of the channel stability descends to the right. Meanwhile, a limit line of the core stability ascends to the right because an increase in the uranium inventory and a decrease in the cross-sectional area of the water rods degrades the core safety. Therefore, the allowable zone from the viewpoint of stability locates at the center in FIG. 6 and is given by an angular hill-shaped region defined by the limit line of the channel stability and the limit line of the core stability.

The larger uranium inventory reduces the fuel cycle cost and, therefore, it is preferable from the viewpoint of fuel economy. It will be understood that, inside the stability allowable zone of FIG. 6, a portion near the intersect (i.e., the hill's top) between the limit line of the channel stability and the limit line of the core stability requires the minimum fuel cycle cost and hence is most preferable. Thus, the range in the vicinity of the hill's top (i.e., near 10 $cm^2$ in terms of the cross-sectional area of the water rods) provides an optimum point for achieving the channel stability, the core stability, as well as fuel economy at the same time. That range spans from 9 to 11 $cm^2$ in terms of the cross-sectional area of the water rods.

To enhance stability, it has been proposed in the prior art to provide an orifice plate just below the fuel assembly to thereby increase flow resistance, or to adopt low pressure-drop type spacers. By so adding the orifice resistance or adopting the low pressure-drop type spacers, stability is improved and the limit line of each safety is so moved as to enlarge the allowable zone. In this case, however, since both the limit lines are moved upward, the cross-sectional area of the water rods corresponding to the optimum point (i.e., the hill's top) remains substantially the same. Accordingly, setting the cross-sectional area of the water rods to the range of 9 to 11 $cm^2$ is also desirable in improving fuel economy from the above point.

For the above reason, in this embodiment, the total cross-sectional area of the water rods 4 is set to about 9 $cm^2$ that is apparently close to the optimum point. As a result, the channel safety, the core safety, as well as fuel economy are improved in this embodiment. Additionally, the improved stability renders equipment installed for higher stability unnecessary.

To enlarge the cross-sectional area of the water rods, adopting a large-size water rod is advantageous in reducing the number of fuel rods which must be sacrificed, and reducing the coolant flow passage area which is less effective to cool fuel rods (i.e., increasing a critical power). Assuming that the spacings between the water rods and the fuel rods adjacent to the water rods are constant, it is most preferable in the case of circular water rods to use the unit lattices of $2 \times 2$ as a water rod for effective utilization of the space.

Therefore, in this embodiment, a central region of the fuel assembly, where the neutron moderating effect is small, corresponding to 10 unit lattices is allocated as the water rod region, and the lattice positions in the water rod region are selected such that two or more of four lattice positions adjacent to each of the water rod lattice positions are those positions where the water rod region adjoins. By so doing, three large-size circular water rods each with the size corresponding to $2 \times 2$ lattice are arranged and, simultaneously, the coolant flow passage area which is less effective to cool fuel rods is diminished. The critical power is thus increased.

Figure 10:
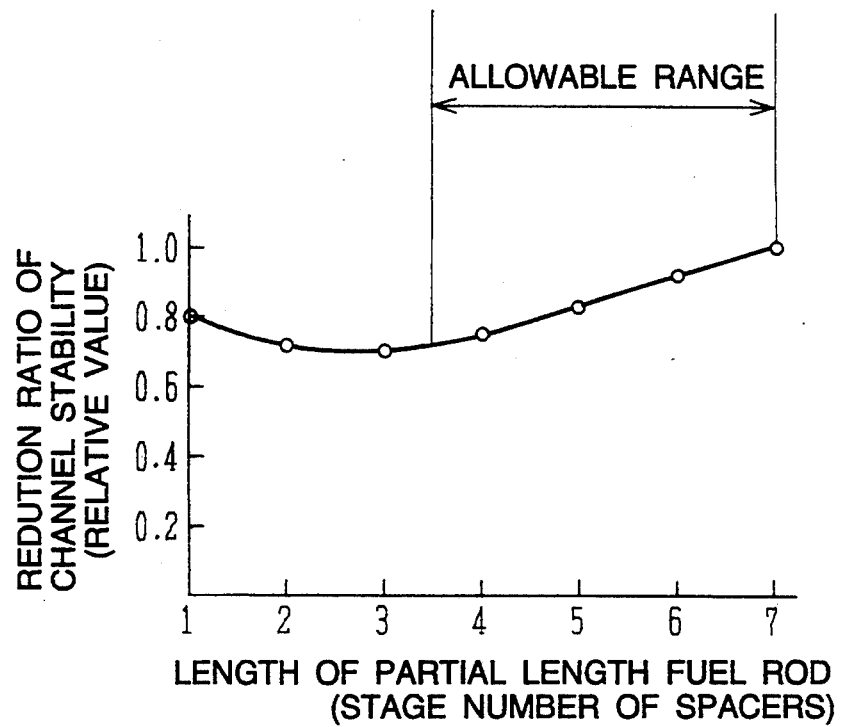
FIG. 10 is a characteristic graph showing the relationship between the length of a partial length fuel rod and channel stability.
Figure 11:
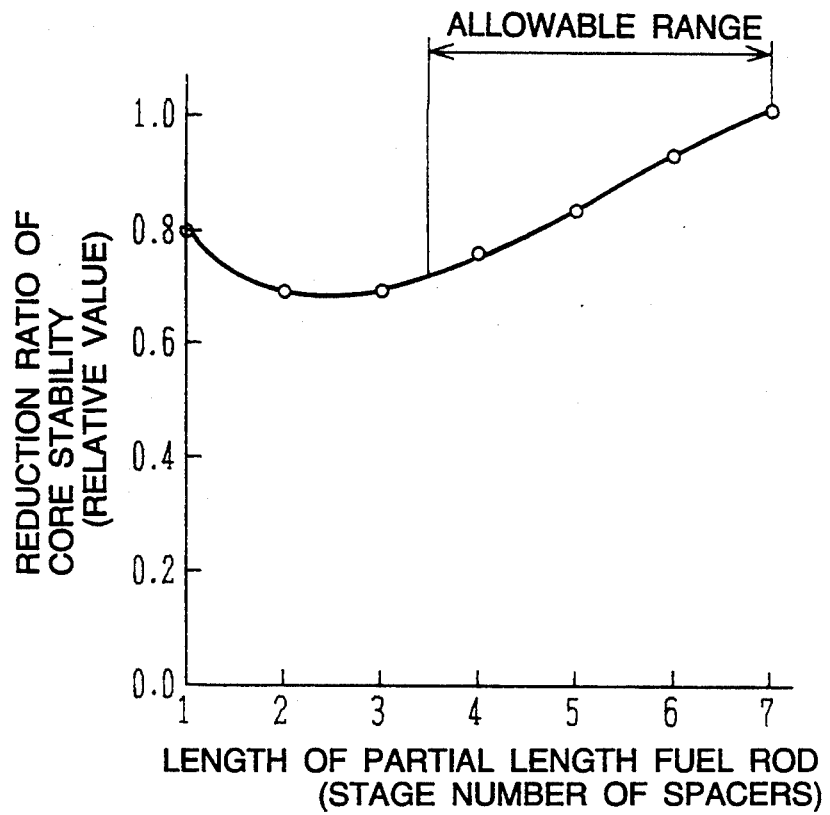
FIG. 11 is a characteristic graph showing the relationship between the length of a partial length fuel rod and core stability.

Finally, a description will be given of how the length of the partial length fuel rods 3 affects the channel stability and the core stability. FIGS. 10 and 11 show results obtained by evaluating the channel stability and the core stability, respectively, while changing the length of the partial length fuel rod 3, on a condition that the uranium inventory is kept constant. In FIGS. 10 and 11, the horizontal axis represents the upper end position of the partial length fuel rod 3 and the vertical axis represents a reduction ratio. When the upper end of the partial length fuel rod is lowered from a position of the 7th-stage fuel spacer (corresponding to the right end in each graph) counting from the bottom, the coolant flow passage area within the fuel assembly is enlarged in an upper portion of the fuel assembly, whereupon the pressure drop in the fuel assembly is reduced and both the channel stability and the core stability are improved. However, if the length of the partial length fuel rod is shortened to be less than the 3rd-stage fuel spacer counting from the bottom, the outer diameter of the fuel rods is increased and the pressure drop in a lower portion of the fuel assembly is also increased because the analysis is made on condition that the uranium inventory is kept constant. It is thus found that the stability is degraded. Also, with the diameter of the fuel rods increasing, the spacing between the fuel rods is narrowed to make thermal conditions marginal. Therefore, the upper end position of the partial length fuel rod is optimum at both the 4th-stage fuel spacer and the 5th-stage fuel spacer. The 6th-stage fuel spacer is also usable. Expressing the positions of the fuel spacers at these stages in terms of a ratio thereof to the fuel effective length of the full fuel rod, since the lower tie plate is located below the 1st-stage fuel spacer and the upper tie plate is located above the 7th-stage fuel spacer, the 4th-stage fuel spacer is installed at a position of 4/8, i.e., ½, of the fuel effective length of the fuel rod 2, and the 6th-stage fuel spacer is installed at a position of 6/8, i.e., ¾, of the fuel effective length of the fuel rod 2. Consequently, if the fuel effective length of the partial length fuel rod 3 ranges from ½ to ¾ of the fuel effective length of the fuel rod 2, there can be obtained an effect of improving the channel stability and the core stability.

For the above reason, in this embodiment, the length of the partial length fuel rod 3 is set to 15/24 of the fuel effective length of the fuel rod 2, i.e., to such a length that the upper end of the partial length fuel rod 3 is supported by the 5th-stage fuel spacer. As a result, the channel stability and the core stability are improved. If the length of the partial length fuel rod 3 is set to such a length that its upper end is supported by the 4th-stage fuel spacer, a stability margin is further increased.

(Advantages)

According to this embodiment, since the lattice array of the fuel rods and the arrangement of both the water rods and the partial length fuel rods are made optimum, it is possible to obtain an effect of reducing the void coefficient, enhance the reactivity control capability, and reduce both the reactivity loss and the local power peaking. Therefore, fuel economy and the thermal margin can be improved. Results of trial calculation shows that, comparing the fuel assembly constructed as explained in this embodiment and a conventional fuel assembly comprising a number of fuel rods arrayed in a square lattice pattern of $8 \times 8$ and two water rods (with a diameter being smaller than the pitch of the fuel rod array) which are arranged at the center of the fuel rod array and circular in cross-section (i.e., a fuel assembly having four partial length fuel rods 17 as shown in FIG. 2 of JP, A, 60-224092), an absolute value of the void coefficient representing the reactivity control capability can be reduced by about 10% and the hot-cold swing can be reduced by about 1.0% $\Delta k$. Another effect of raising the neutron infinite multiplication factor of the fuel assembly on the order of 0.5 Δk without increasing the local power peaking can also be obtained.

According to this embodiment, an effect of increasing the control rod worth is further expected while improving a degree of safety and enhancing the core stability.

Second Embodiment

Figure 12:
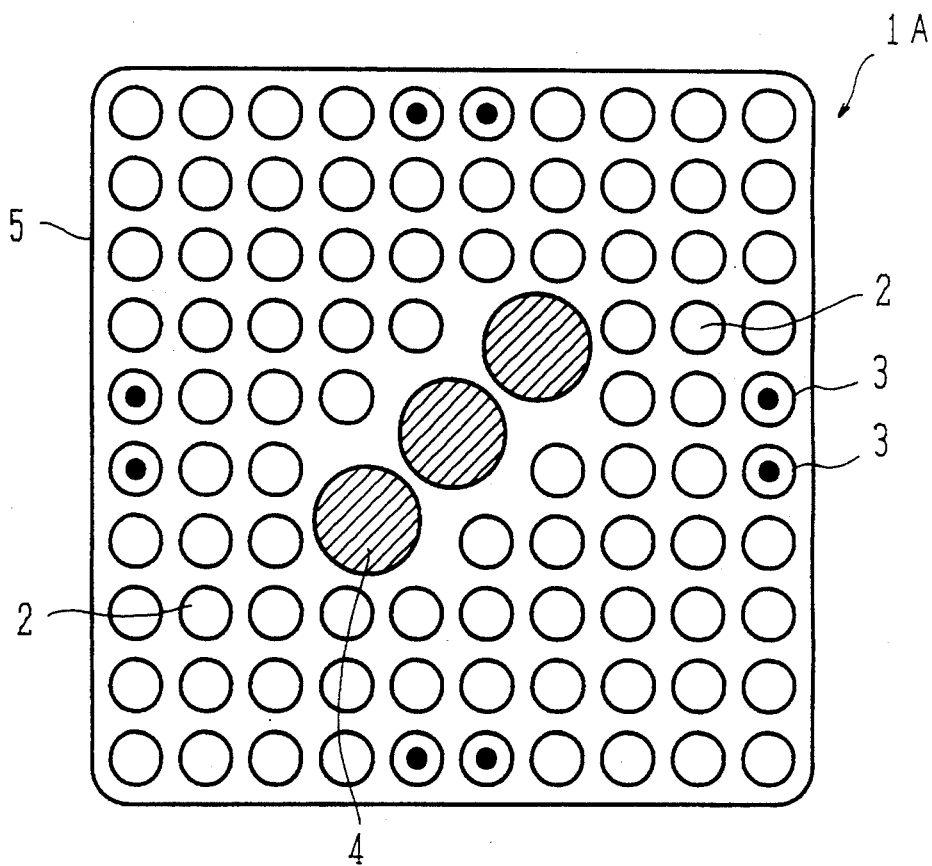
FIG. 12 is a cross-sectional view of a fuel assembly according to a second embodiment of the present invention.
Figure 13:
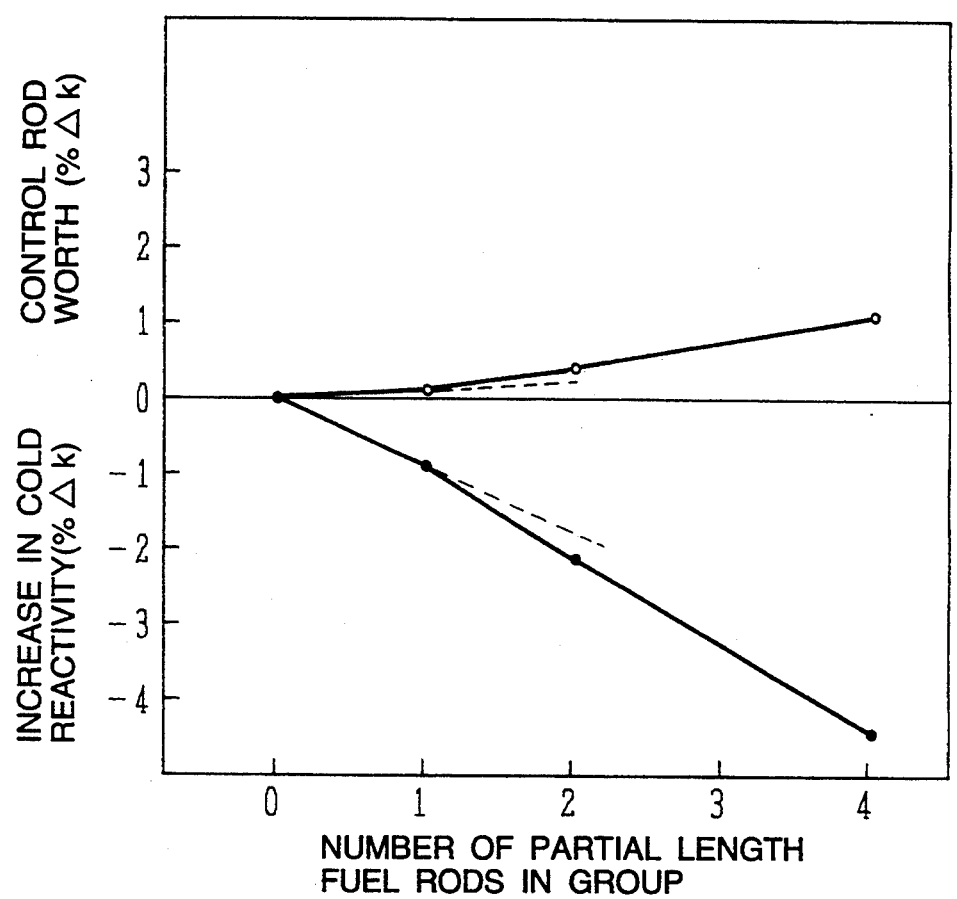
FIG. 13 is a graph showing an effect resulted from arranging partial length fuel rods adjacent to each other.

A fuel assembly according to a second embodiment of the present invention will be described below with reference to FIGS. 12 and 13. This embodiment is different from the above first embodiment in that the partial length fuel rods are arranged eight in total. More specifically, in FIG. 12, a fuel assembly 1A of this embodiment has eight partial length fuel rods 3 which are arranged in the outermost layer of the fuel rod array facing the channel box 5 such that every twos are adjacent to each other in each of four sides of the outermost layer. Using the concept of matrix to express lattice positions in the fuel rod array like the above first embodiment, the positions of the partial length fuel rods 3 are indicated by (1, 5), (1, 6); (5, 1), (6, 1); (5, 10), (6, 10); (10, 5), (10, 6). In this embodiment, too, the partial length fuel rods 3 are arranged in lattice positions in the outermost layer of the fuel rod array in the square lattice pattern in such a manner that, when the water rods 4 are projected in the row and column directions, the partial length fuel rods locate inside a projected range of the water rods 4 including the lattice positions at the outermost opposite regions of the projected range.

An effect obtained by arranging two partial length fuel rods 3 adjacent to each other will be explained with reference to FIG. 13. FIG. 13 shows a reactivity control capability and a control rod worth as resulted when the partial length fuel rods are arranged adjacent to each other. As will be seen from FIG. 13, by making the two partial length fuel rods 2 adjacent to each other, there can be obtained a greater effect of improving both the reactivity control capability and the control rod worth than resulted from simply summing an effect obtainable with one partial length fuel rod alone. Even when more than two partial length fuel rods are arranged adjacently to each other (i.e., even when moderators are so localized), there arise no problems in point of ensuring a thermal margin so long as they are located at such positions as to contribute to flattening of the local power peaking, as described in connection with FIG. 4, i.e., they are located in the projected range of the water rods 4.

Consequently, according to this embodiment, there can be obtained an effect of enhancing both the reactivity control capability and the control rod worth two or more times the above first embodiment. In other points, the second embodiment also has the same advantages as those of the first embodiment.

Third Embodiment

A fuel assembly according to a third embodiment of the present invention will be described below with reference to FIG. 14. This embodiment is different from the above second embodiment in that total number of partial length fuel rods is further increased by four and arranged to be adjacent to both the channel box and the water rods. More specifically, in FIG. 14, a fuel assembly 1B of this embodiment has eight partial length fuel rods 3 which are arranged in the outermost layer of the fuel rod array, and four partial length fuel rods 3a which are arranged adjacent to the large-diameter water rods 4. The fuel effective length of the partial length fuel rods 3, 3a is 15/24 of the fuel effective length of the fuel rods 2 as with the above first embodiment.

Since arranging the partial length fuel rods 3a adjacent to the water rods 4 is substantially equivalent to enlarging the water rod region at the center of the fuel assembly, this embodiment has an effect of flattening distribution of thermal neutron flux throughout inner and outer regions of the fuel assembly 1B and, as shown in FIG. 5, also can increase the neutron infinite multiplication factor of the fuel assembly. In this connection, taking into account that the effect of reducing the void coefficient and the effect of increasing the control rod worth are higher in the outer region than the inner water rod regions, as shown in FIGS. 1 and 3, by making the number of the partial length fuel rods 3 adjacent to the channel box 5 larger than the number of partial length fuel rods 3a adjacent to the water rods 4, the number of partial length fuel rods required in terms of the reactivity control capability can be cut down, which provides an effect of increasing the control rod worth. Additionally, arranging the partial length fuel rods 3 and 3a respectively adjacent to the channel box and the water rods together is effective to flatten distribution of thermal neutron flux throughout inner and outer regions of the fuel assembly 1B.

With this embodiment, by arranging the total four partial length fuel rods 3a adjacently to the large-diameter water rods 4, the non-boiling water region at the center of the fuel assembly is increased by about 3 $cm^2$ and the neutron infinite multiplication factor is increased by about 1%. Further, an absolute value of the void coefficient as an index representing the reactivity control capability can be reduced about 40% in comparison with that of the conventional fuel assembly shown in FIG. 2 of the above-cited JP, A, 60-224092, making it possible to ensure the fuel inventory without sacrificing the core stability. In other points, the fuel assembly 1B of this embodiment also has the same advantages as those of the first embodiment.

Figure 15:
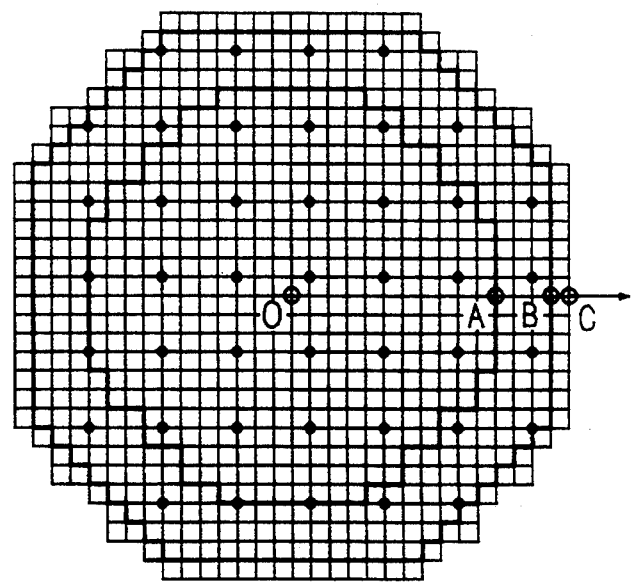
FIG. 15 is a top plan view of a core of a boiling water reactor in which the fuel assembly shown in FIG. 14 is loaded.
Figure 16:
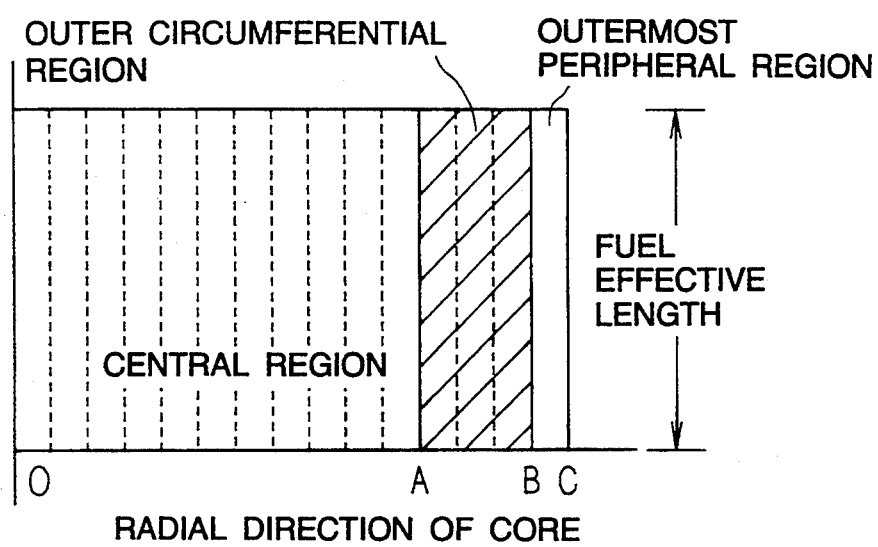
FIG. 16 is a schematic vertical sectional view of the core shown in FIG. 15.
Figure 17:
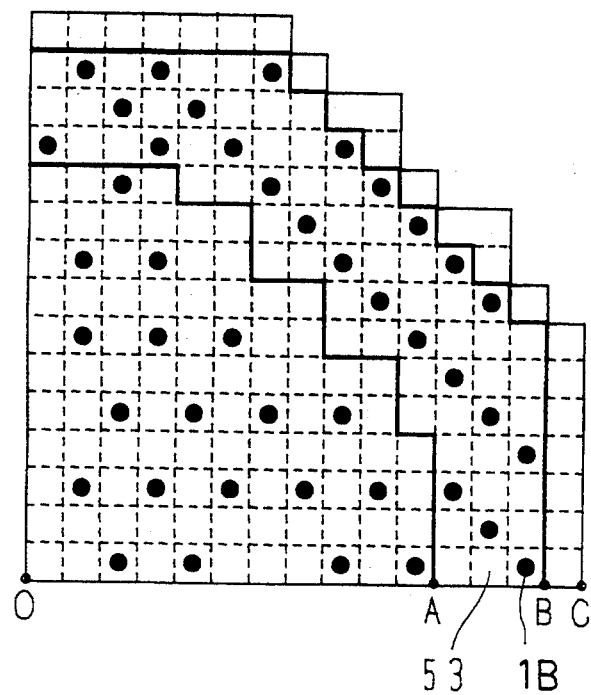
FIG. 17 is an enlarged fragmentary view of the core shown in FIG. 15.
Figure 18:
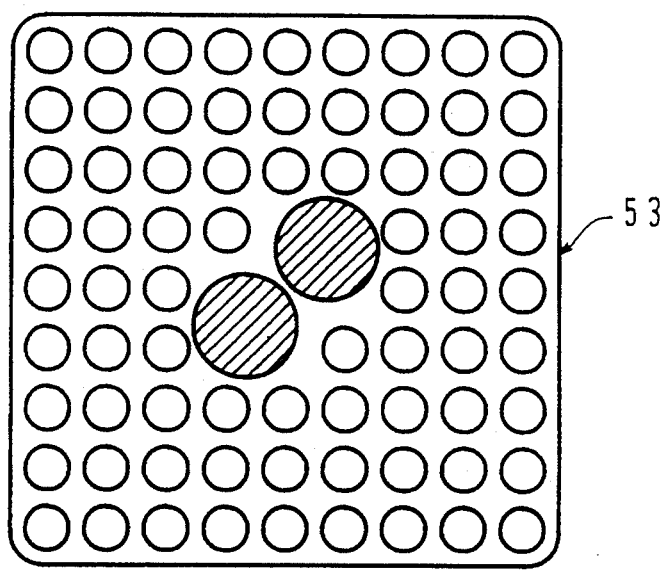
FIG. 18 is a cross-sectional view of a conventional fuel assembly having no partial length fuel rods.

A description will be given of a core of a boiling water reactor using the fuel assembly 1B of this embodiment with reference to FIGS. 15 to 17. The core has, as shown in FIGS. 15 and 16, a central region OA, an outer circumferential region AB, and an outermost peripheral region BC. In the central region OA and an outer circumferential region AB, there are arranged the fuel assemblies 1B and conventional fuel assemblies 53 (i.e., a fuel assembly shown in FIG. 10 of U.S. Pat. No. 4,926,450) having no partial length fuel rods as shown in FIG. 18. Note that as shown in an enlarged fragmentary view of FIG. 17, the loading ratio of the fuel assemblies 1B is smaller in the central region OA than in the outer circumferential region AB.

The fuel assembly 1B of this embodiment has a feature that, since many partial length fuel rods are used, the fuel inventory largely varies in the axial direction. Accordingly, supposing a retrofitted core based on an existing core in which only the conventional fuel assemblies 53 are loaded, an effect of axial neutron flux distribution due to an axial difference in fuel inventory must be taken into consideration. More specifically, if the fuel assembly 1B is loaded among the fuel assemblies 53 having no partial length fuel rods, there is found a tendency for the fuel assemblies 53 to increase the power in a core lower portion and, on the contrary, for the fuel assembly 1B to increase the power in a core upper portion. In view of the above, by dividing the core into three regions as mentioned above and arranging the fuel assemblies 1B (novel fuel) such that they have a smaller loading ratio in the central region OA than in the outer circumferential region AB, the linear power generation rate can be held not larger than a set value.

Figure 19:
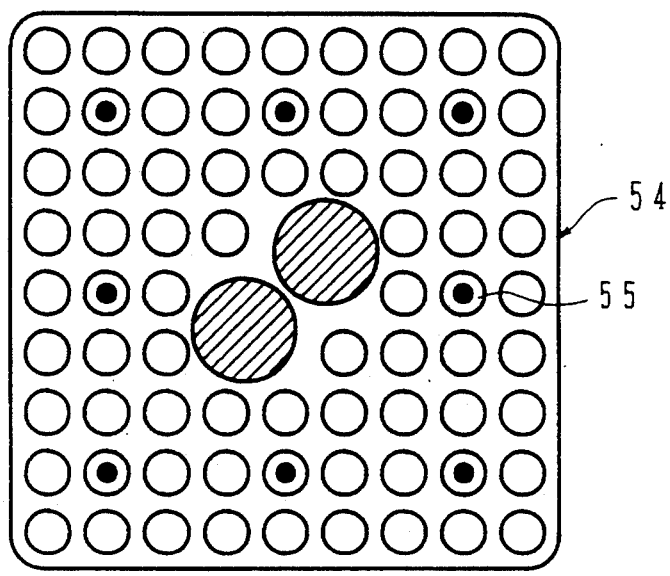
FIG. 19 is a cross-sectional view of a conventional fuel assembly having partial length fuel rods.

Instead of the fuel assembly 53, a fuel assembly 54 may be used which is shown in FIG. 19 and has a smaller percentage of partial length fuel rods 55 than the fuel assembly 1B (i.e., a fuel assembly resulted from applying the arrangement of partial length fuel rods 17 shown in FIG. 3 of JP, A, 60-224092 to the fuel assembly shown in FIG. 10 of U.S. Pat. No. 4,926,450), the fuel assembly 54 being loaded at each of positions where the fuel assemblies 53 are loaded as shown in FIG. 17.

The above core arrangement is effective in using fuel assemblies having different proportions of partial length fuel rods together. Instead of the fuel assembly 1B, any of the fuel assemblies of the first and second embodiments can also be used. Further, instead of the fuel assembly 1B, any of the fuel assemblies 1N, 1Q and 1R, described later, can also be used.

Fourth Embodiment

Figure 20:
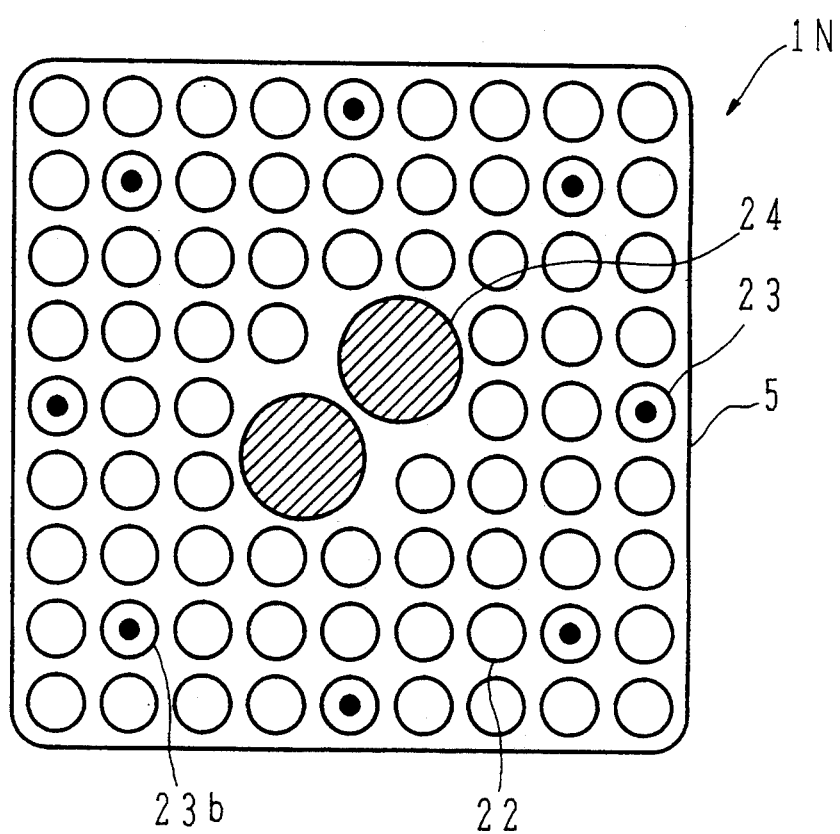
FIG. 20 is a cross-sectional view of a fuel assembly according to a fourth embodiment of the present invention.

A fuel assembly 1N according to a fourth embodiment of the present invention will be described below with reference to FIG. 20. In the fuel assembly of this fourth embodiment, fuel rods are arrayed in a square lattice pattern of 9 rows and 9 columns.

The fuel assembly 1N comprises a number of fuel rods 22 and partial length fuel rods 23, 23b which are arrayed in a square lattice pattern of 9×9, and two large-diameter water rods 24 which are circular in cross-section and diagonally arranged in a lattice region of 3×3 at the center of the fuel rod array. Those fuel rods and the water rods 4 are enclosed at their surroundings by a channel box 5 having a rectangular cross-section. The total number of the fuel rods 22 and the partial length fuel rods 23, 23b is 90. The partial length fuel rods 23 are arranged four at the middle positions of four sides of the outermost layer, i.e., (1, 5), (5, 1), (9, 5), (5, 9). The partial length fuel rods 23b are arranged at respective corners of the fuel rod array in a second layer counting from outermost layer. Thus, the partial length fuel rods 23b are also four in number. The partial length fuel rods 23, 23b each have a fuel effective length equal to 15/24 of that of the fuel rods 22 as with the above first embodiment. The total cross-sectional area of the two large-diameter water rods 24 is about 9 cm² similarly to the first embodiment. The two large-diameter water rods 24 occupy such a space in the aforesaid lattice region of 3×3 as able to accommodate seven fuel rods.

This embodiment can also provide the same effects and advantages as those obtainable with the above first embodiment. However, the reactivity control effect in this embodiment is smaller than that in the above third embodiment because the proportion of the number of partial length fuel rods is reduced in the former. On the contrary, since the fuel rod array is changed from 10×10 lattice to 9×9 lattice, it is possible to reduce a pressure drop and improve stability, resulting in an advantage of further increasing the fuel inventory.

Furthermore, in this embodiment, by arranging the partial length fuel rods 23b in a layer adjacent to the outermost layer at its corners, there is obtained an effect of rendering distribution of a coolant flow rate and distribution of a vapor volume rate more uniform within the channel box 5. In the region facing the channel box 5, particularly, in the region near its corners, friction resistance is generally so large that the coolant flow rate tends to decrease. This tendency can be overcome by arranging the partial length fuel rods 23b at respective corners of the layer adjacent to the outermost layer. Additionally, by making the partial length fuel rods 23b not adjacent to the partial length fuel rods 23 arranged in the outermost layer, an increase in the local power peaking of the fuel rods 22 adjacent to the partial length fuel rods can be suppressed. As a result, the critical power as an index representing the thermal margin can be increased more than the above third embodiment.

Fifth Embodiment

Figure 21:
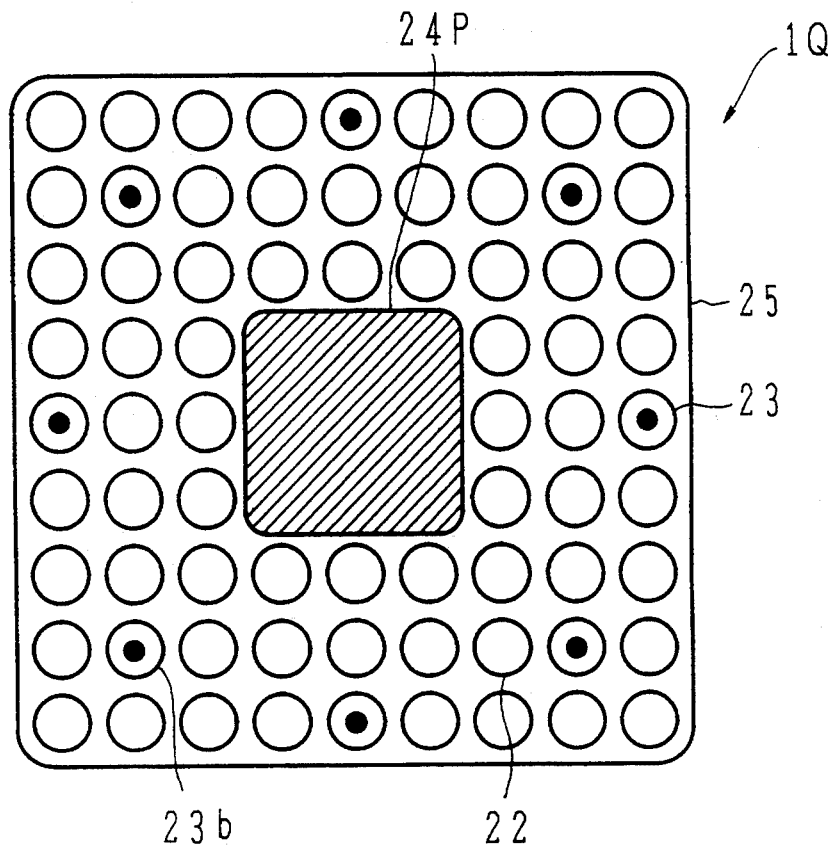
FIG. 21 is a cross-sectional view of a fuel assembly according to a fifth embodiment of the present invention.

A fuel assembly 1Q according to a fifth embodiment of the present invention will be described below with reference to FIG. 21. In this embodiment, the arrangement of the partial length fuel rods shown in the above fourth embodiment is applied to the fuel assembly shown in FIG. 2 of U.S. Pat. No. 4,781,885. Specifically, the fuel assembly 1Q of this embodiment adopts a single large-size square water rod 24P as the large-size water rods to be positioned at the center. This embodiment can also provide the same effects and advantages as those obtainable with the above fourth embodiment.

Sixth Embodiment

Figure 22:
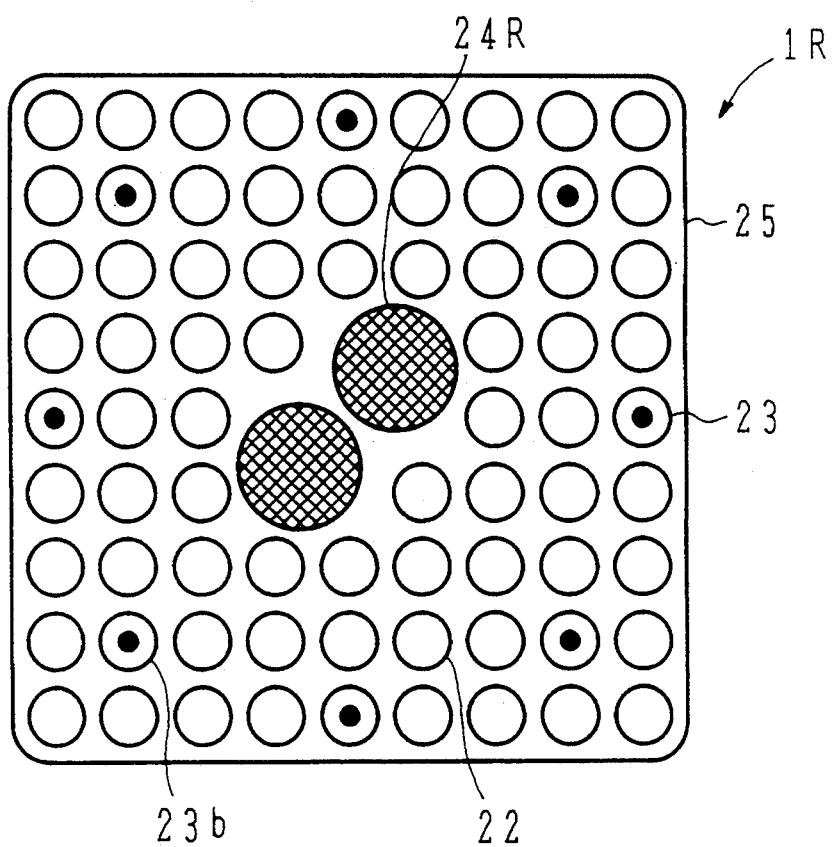
FIG. 22 is a cross-sectional view of a fuel assembly according to a sixth embodiment of the present invention.

A fuel assembly according to a sixth embodiment of the present invention will be described below with reference to FIGS. 22 to 25. In a fuel assembly 1R of this embodiment, as shown in FIG. 22, the neutron moderating rod in the above fourth embodiment is replaced by a so-called spectral shift rod 24R of which axial water level changes depending on a core flow rate. Stated otherwise, the fuel assembly 1R is obtained by arranging the partial length fuel rods 23 and 23b in a fuel assembly shown in FIG. 4 of WO88/02176 (PCT/JP87/00676) at the same positions as those in the fuel assembly 1N.

Figure 23:
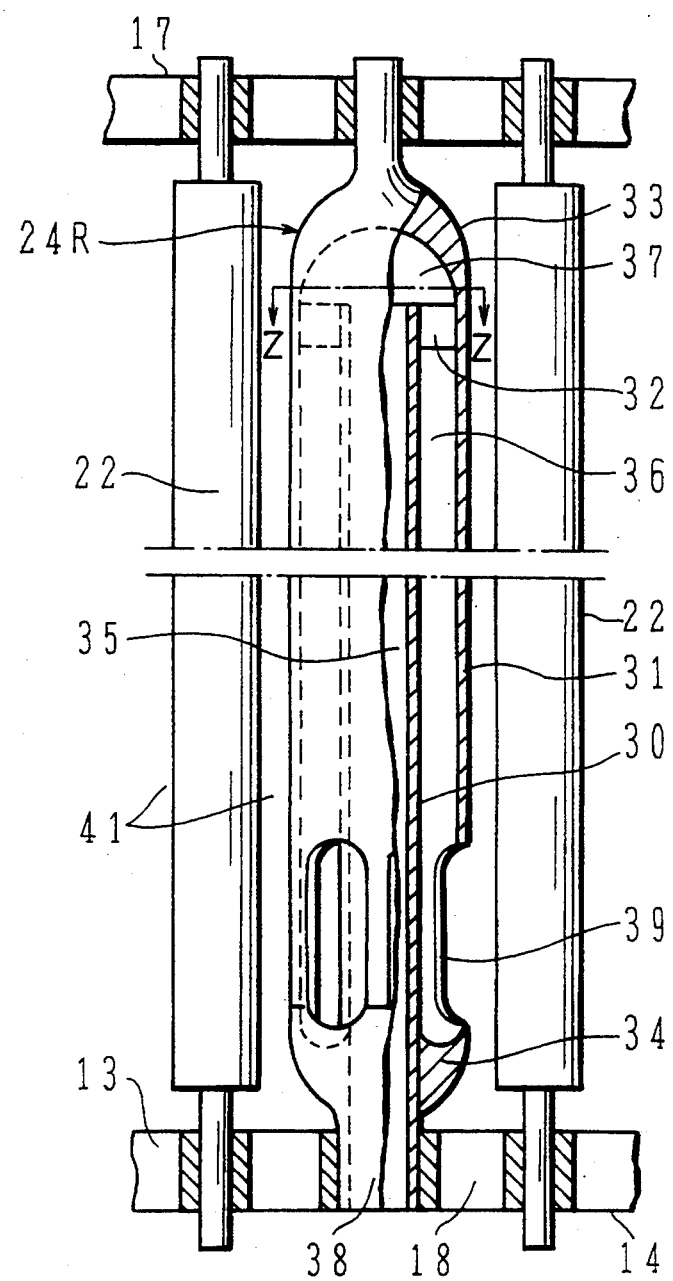
FIG. 23 is a front view, partially sectioned, showing the structure of a spectral shift rod used in the fuel assembly shown in FIG. 22.
Figure 24:
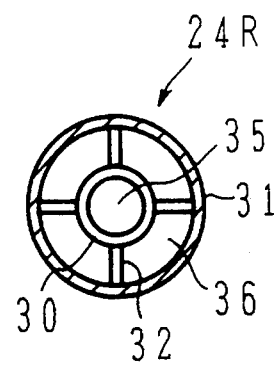
FIG. 24 is a cross-sectional view taken along line Z—Z in FIG. 23.

The detailed structure of the spectral shift rod 24R is shown in FIGS. 23 and 24. As illustrated in FIG. 7A of WO88/02176, the spectral shift rod 24R comprises an inner pipe 30, an outer pipe 31 and spacers 32. The outer pipe 31 and the inner pipe 30 are arranged in concentrical relation such that the outer pipe 31 entirely surrounds an outer circumference of the inner pipe 30. An upper end of the outer pipe 31 is sealedly closed by a cover portion 33 and an upper end of the cover portion 33 is inserted to and held by an upper tie plate 12. The cover portion 33 gradually narrows a space above the inner pipe 30 so as to define a gap between itself and the upper end of the inner pipe 30. An upper end of the inner pipe 30 is fixed to an inner surface of the outer pipe 31 through plate-like spacers 32 arranged to radially extend from an axis of the spectral shift rod 24R. A lower end of the outer pipe 31 is closed by a closure 34. A lower end of the inner pipe 30 penetrates through the closure 34 and projects downwardly therefrom. Thus, the lower end of the inner pipe 30 penetrates through a fuel rod support 14 of a lower tie plate 13. A cooling water inlet 38 formed in the lower end of the inner pipe 30 is open to a space 15 in the lower tie plate 13. The interior of the inner pipe 30 forms a cooling water rising passage 35, while an annular passage defined between the inner pipe 30 and the outer pipe 31 forms a cooling water falling passage 36. In a wall of the outer pipe 31 in its lower portion, there are formed a plurality of cooling water outlets 39 spaced from each other along a circumference of the outer pipe 31. These cooling water outlets 39 are provided with equal angular intervals therebetween in the circumferential direction. The cooling water outlets 39 are open to a region above the fuel rod support 14. In this embodiment, the fuel rod support 14 also serves as a resisting member. The cooling water rising passage 35 and the cooling water falling passage 35 are interconnected at a return portion 37 formed in an upper end of the spectral shift rod 24R. Thus, the spectral shift rod 24R has therein a cooling water passage, in the form of an inverted-U, built up by the cooling water rising passage 35, the cooling water falling passage 36 and the return portion 37. The total cross-sectional area of all through holes 18 formed in the fuel rod support 14 is smaller than the total cross-sectional area of coolant passages 41 defined outside the spectral shift rod 24R within a channel box (not shown) of the fuel assembly 1R. The coolant passages 41 are defined between the fuel rods.

When the fuel assembly 1R of this embodiment is loaded into a core of a boiling water reactor (all fuel assemblies being the fuel assemblies 1R) and the boiling water reactor is set into operation, a large part of cooling water is directly introduced to the coolant passages 41 within the fuel assembly 1R via the space 15 in the lower tie plate 13 and the through holes 18 formed in the fuel rod support 14. The remaining part of the cooling water having flown into the space 15 in the low tie plate 13 flows into the cooling water rising passage 35 of the spectral shift rod 24R through the cooling water inlet 38 and, after passing the return portion 37 and the cooling water falling passage 36, it is discharged through the cooling water outlets 39 to the region above the fuel rod support 14. The cooling water discharged through the cooling water outlets 39 becomes a phase of liquid or gas (vapor) depending on a flow rate of the cooling water that flows into the spectral shift rod 24R through the cooling water inlet 38. Thus, depending on the core flow rate, a fluid condition of the coolant in the spectral shift rod 24R varies as shown in FIGS. 3A, 3B and 3C of WO88/02176. More specifically, at the core flow rate not greater than 100%, there produces such a condition (shown in FIG. 3A of the reference) in the spectral shift rod 24R that a liquid level can exist in the cooling water rising passage 35. At the core flow rate of 110%, there produces such a condition (shown in FIG. 3C of the reference) in the spectral shift rod 24R that a substantially single-phase flow fills both the cooling water rising passage 35 and the cooling water falling passage 36. The total cross-sectional area of all the through holes 18 formed in the fuel rod support 14 is set produce change from the condition where a liquid level is formed in the spectral shift rod 24R to the condition where a liquid level is not formed therein, as mentioned above. The smaller the total cross-sectional area of all the through holes 18, the greater is resistance against the cooling water flowing into the coolant passages 41 via the fuel rod support 14. This is because the total cross-sectional area of all the through holes 18 formed in the fuel rod support 14 is smaller than the total cross-sectional area of the coolant passages 41 defined outside the spectral shift rod 24R within the channel box (not shown) of the fuel assembly 1R.

In that way, the spectral shift rod 24R can adjust a neutron moderating effect by changing a water level formed therein depending on the core flow rate and, as a result, it can be utilized to control reactivity or power.

Details of this control procedure is described in WO88/02176.

Figure 25:
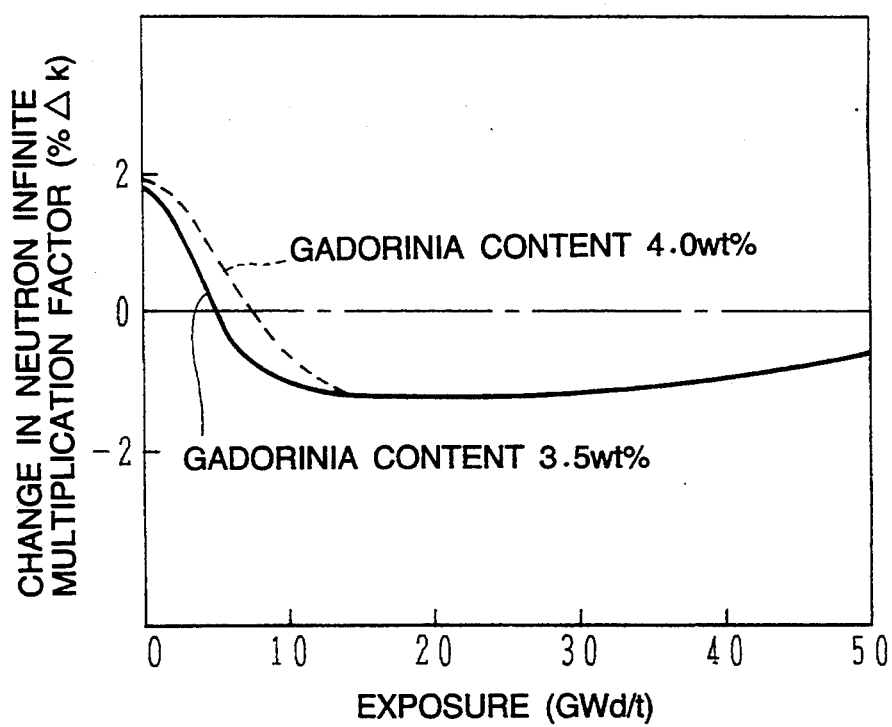
FIG. 25 is a characteristic graph showing the relationship between a neutron infinite multiplication factor and exposure as resulted when a vapor volume rate in the spectral shift rod varies from 100% to 0%.

Meanwhile, in a BWR fuel assembly, burn-up reactivity is generally controlled by gadolinia. In the initial stage of the operation cycle, therefore, an interaction between gadolinia contained in fresh fuel and the spectral shift rod must be taken into consideration. FIG. 25 shows change in the neutron infinite multiplication factor as resulted when the core flow rate is gradually increased from the beginning of exposure so that the vapor volume rate in the spectral shift rod 24R varies from 100% to 0%. It will be seen from FIG. 25 that, in the initial period of lifetime where gadolinia is present, a water level in the spectral shift rod is lowered and hence the neutron infinite multiplication factor increases inversely. This is attributable to that the neutron moderating effect is impeded and thermal neutron absorption due to gadolinia is reduced. In other words, it will be understood that, to effectively perform reactivity control or power control with a water level in the spectral shift rod, the amount of gadolinia requires to be reduced.

In this embodiment, since the reactivity control effect is enhanced and the shutdown margin is improved by arranging the partial length fuel rods, the amount of gadolinia can be reduced. As a result, it is possible to improve fuel economy and achieve the best use of an effect of the spectral shift rod.

What is claimed is:

1. A fuel assembly comprising a number of fuel rods arrayed in a square lattice pattern, and at least one neutron moderating rod having a cross-sectional area of a moderator larger than a cross-sectional area of a unit lattice of the fuel rod array, wherein:
   (a) said fuel rods include a plurality of first fuel rods and one or more second fuel rods having a shorter fuel effective length than said first fuel rods;
   (b) said second fuel rods are arranged in an outermost layer of said fuel rod array in the square lattice pattern at positions other than corners of the outermost layer; and
   (c) among the fuel rods inside said outermost layer of said fuel rod array in the square lattice pattern and arranged in a layer adjacent to said outmost layer, all of the fuel rods adjacent to said second fuel rods in said outermost layer are said first fuel rods.

2. A fuel assembly according to claim 1, wherein said second fuel rods in said outermost layer are arranged at positions other than the corners and positions adjacent to the corners.

3. A fuel assembly according to claim 1, wherein when said neutron moderating rod is projected in two directions orthogonal to each other in said fuel rod array in the square lattice pattern, said second fuel rods arranged in said outermost layer are located inside a projected range of said neutron moderating rod including the outermost opposite regions of the projected range.

4. A fuel assembly according to claim 1, wherein the cross-sectional area of the moderator in said neutron moderating rod is from 7 to 14 cm$^2$.

5. A fuel assembly according to claim 1, wherein said neutron moderating rod is arranged in a region able to accommodate 7 to 12 said fuel rods.

6. A fuel assembly according to claim 1, wherein said fuel rods further comprise one or more third fuel rods having a shorter fuel effective length than said first fuel rods, said third fuel rods being arranged adjacent to said neutron moderating rod.

7. A fuel assembly according to claim 1, wherein the number of said second fuel rods arranged in said outer layer is larger than the number of said third fuel rods arranged adjacent to said neutron moderating rod.

8. A fuel assembly according to claim 1, wherein said fuel rods further comprise one or more third fuel rods having a shorter fuel effective length than said first fuel rods, said third fuel rods being arranged in a fuel rod layer adjacent to said outermost layer inside thereof at positions of corners of said fuel rod layer.

9. A fuel assembly according to claim 1, wherein said second fuel rods are arranged two adjacent to each other in said outermost layer.

10. A fuel assembly according to claim 1, wherein said second fuel rods have a fuel effective length in a range of $\frac{1}{2}$ to $\frac{3}{4}$ of the fuel effective length of said first fuel rods.

11. A fuel assembly according to claim 1, wherein said neutron moderating rod is circular in cross-section and arranged three in a lattice region of 4×4 at the center of said fuel assembly along a diagonal line of said lattice region.

12. A fuel assembly according to claim 1, wherein said neutron moderating rod is circular in cross-section and arranged two in a lattice region of 3×3 at the center of said fuel assembly along a diagonal line of said lattice region.

13. A fuel assembly according to claim 1, wherein said neutron moderating rod includes a spectral shift rod in which an axial water level is changed depending on a core flow rate.

14. A fuel assembly according to claim 1, wherein the fuel rods arranged inside said outermost layer of said fuel rod array in the square lattice pattern in one layer adjacent to said outermost layer and another one layer adjacent to said one layer are said first fuel rods.

15. A fuel assembly comprising a number of fuel rods arrayed in a square lattice pattern, and at least one neutron moderating rod having a cross-sectional area of a moderator larger than a cross-sectional area of a unit lattice of the fuel rod array, wherein:
   (a) said fuel rods include a plurality of first fuel rods and one or more second fuel rods having a shorter fuel effective length than said first fuel rods;
   (b) said second fuel rods are arranged in an outermost layer of said fuel rod array in the square lattice pattern at positions other than corners of the outermost layer; and
   (c) all of the fuel rods inside said outermost layer of said fuel rod array in the square lattice pattern and arranged in a layer adjacent to said outermost layer are said first fuel rods.

16. A fuel assembly according to claim 15, wherein said second fuel rods in said outermost layer are arranged at positions other than the corners and positions adjacent to the corners.

17. A fuel assembly according to claim 15, wherein when said neutron moderating rod is projected in two directions orthogonal to each other in said fuel rod array in the square lattice pattern, said second fuel rods arranged in said outermost layer are located inside a projected range of said neutron moderating rod including the outermost opposite regions of the projected range.

18. A fuel assembly according to claim 15, wherein said neutron moderating rod is arranged in a region able to accommodate 7 to 12 said fuel rods.

19. A fuel assembly according to claim 15, wherein said fuel rods further comprise one or more third fuel rods having a shorter fuel effective length than said first fuel rods, said third fuel rods being arranged adjacent to said neutron moderating rod.

20. A fuel assembly according to claim 15, wherein the number of said second fuel rods arranged in said outer layer is larger than the number of said third fuel rods arranged adjacent to said neutron moderating rod.

21. A fuel assembly according to claim 15, wherein said second fuel rods are arranged two adjacent to each other in said outermost layer.

22. A fuel assembly according to claim 15, wherein said second fuel rods have a fuel effective length in a range of $\frac{1}{2}$ to $\frac{3}{4}$ of the fuel effective length of said first fuel rods.

23. A fuel assembly according to claim 15, wherein said neutron moderating rod is circular in cross-section and arranged three in a lattice region of 4×4 at the center of said fuel assembly along a diagonal line of said lattice region.

24. A fuel assembly according to claim 15, wherein said neutron moderating rod is circular in cross-section and arranged two in a lattice region of 3×3 at the center of said fuel assembly along a diagonal line of said lattice region.

25. A fuel assembly according to claim 15, wherein said neutron moderating rod includes a spectral shift rod in which an axial water level is changed depending on a core flow rate.

26. A fuel assembly according to claim 15, wherein the fuel rods arranged inside said outermost layer of said fuel rod array in the square lattice pattern in one layer adjacent to said outermost layer and another one layer adjacent to said one layer are said first fuel rods.

27. A fuel assembly according to claim 15, wherein the lattice pattern of said fuel rod array comprises 10 rows and 10 columns.

28. A reactor core using light water as a coolant, wherein:
   (a) said core includes a plurality of first fuel assemblies and a plurality of second fuel assemblies, said second fuel assemblies each comprise a number of fuel rods;
   (b) said first fuel assemblies each comprise a number of fuel rods arrayed in a square lattice pattern and at least one neutron moderating rod having a cross-sectional area of a moderator larger than a cross-sectional area of a unit lattice of the fuel rod array, said fuel rods including a plurality of first fuel rods and one or more second than said first fuel rods, said second fuel rods being arranged in an outermost layer of said fuel rod array in the square lattice pattern at positions other than corners of the outermost layer, among the fuel rods inside said outermost layer of said fuel rod array in the square lattice pattern and arranged in a layer adjacent to said outermost layer, all of the fuel rods adjacent to said second fuel rods in said outermost layer being said first fuel rods; and
   (c) said first fuel assemblies and said second fuel assemblies are loaded in a core central portion and a core circumferential portion, said first fuel assemblies having a smaller loading ratio in the core central portion than in the core circumferential portion.

29. A reactor core according to claim 28, wherein in said first fuel assemblies, said second fuel rods in said outermost layer are arranged at positions other than the corners and positions adjacent to the corners.

30. A reactor core according to claim 28, wherein said second fuel assemblies include no fuel rods having a shorter fuel effective length than said first fuel rods.

31. A reactor core according to claim 28, wherein said second fuel assemblies include one or more third fuel rods having a shorter fuel effective length than said first fuel rods, the number of said third fuel rods being smaller than the number of said second fuel rods.

* * * * *